United States Patent [19]

Urushiwara et al.

[11] Patent Number: 4,842,965
[45] Date of Patent: Jun. 27, 1989

[54] NON AQUEOUS ELECTROCHEMICAL BATTERY WITH EXPLOSION PROOF ARRANGEMENT AND A METHOD OF THE PRODUCTION THEREOF

[75] Inventors: Hisashi Urushiwara, Toride; Tugiyasu Iwamaru, Settsu; Kenya Kazehara, Ako; Osamu Watanabe, Toyonaka; Kenichi Sawada, Osaka; Kiyoshi Sato; Hirokazu Yoshikawa, both of Ibaraki; Shigeru Ikenari, Suita; Kenichi Yokoyama, Takatsuki; Yoshio Uetani, Ibaraki, all of Japan

[73] Assignee: Hitachi Maxell, Ltd., Osaka, Japan

[21] Appl. No.: 101,259

[22] Filed: Sep. 25, 1987

[30] Foreign Application Priority Data

| Sep. 27, 1986 | [JP] | Japan | 61-228760 |
| Sep. 27, 1986 | [JP] | Japan | 61-228761 |
| Sep. 27, 1986 | [JP] | Japan | 61-228764 |
| May 19, 1987 | [JP] | Japan | 62-123142 |
| May 19, 1987 | [JP] | Japan | 62-123143 |
| May 19, 1987 | [JP] | Japan | 62-123144 |
| May 19, 1987 | [JP] | Japan | 62-123145 |
| May 27, 1987 | [JP] | Japan | 62-130246 |
| Jul. 20, 1987 | [JP] | Japan | 62-180770 |

[51] Int. Cl.$^4$ .................... H01M 2/12; B65D 51/16
[52] U.S. Cl. .................... 429/56; 220/207; 220/367
[58] Field of Search .................... 429/53, 56; 220/207, 220/89 A, 367

[56] References Cited

U.S. PATENT DOCUMENTS

| 2,576,431 | 11/1951 | White | 220/89 A |
| 3,615,867 | 10/1971 | Cich et al. | 29/623.1 |
| 3,815,534 | 6/1974 | Kneusel | 220/89 A |
| 3,826,412 | 7/1974 | Kneusel | 222/397 |
| 4,053,691 | 10/1977 | Ciliberti, Jr. | 429/163 |
| 4,175,166 | 11/1979 | Rosansky . | |
| 4,256,812 | 3/1981 | Tamura et al. . | |
| 4,400,453 | 8/1983 | Blomgren et al. . | |
| 4,484,691 | 11/1984 | Lees | 429/56 X |
| 4,579,495 | 4/1986 | Dassler et al. | 413/15 |
| 4,661,959 | 7/1986 | Ramero | 429/53 X |
| 4,698,282 | 10/1987 | Mantelle | 429/56 |

FOREIGN PATENT DOCUMENTS

| 0140021 | 5/1985 | European Pat. Off. . |
| 2079293 | 11/1971 | France . |
| 118363 | 7/1982 | Japan . |
| 79965 | 5/1984 | Japan . |
| 154743 | 9/1984 | Japan . |
| 574350 | 4/1976 | Switzerland . |

Primary Examiner—Stephen J. Kalafut
Attorney, Agent, or Firm—Birch, Stewart, Kolasch & Birch

[57] ABSTRACT

In a non-aqueous electrochemical battery, there are formed a plurality of grooves with thinned bottom portion on the bottom of the battery container. The grooves are intersected at least at one point and the bottom of the grooves are made flat so that the explosion-proof arrangement is operable for a desired inner pressure of the battery.

7 Claims, 17 Drawing Sheets

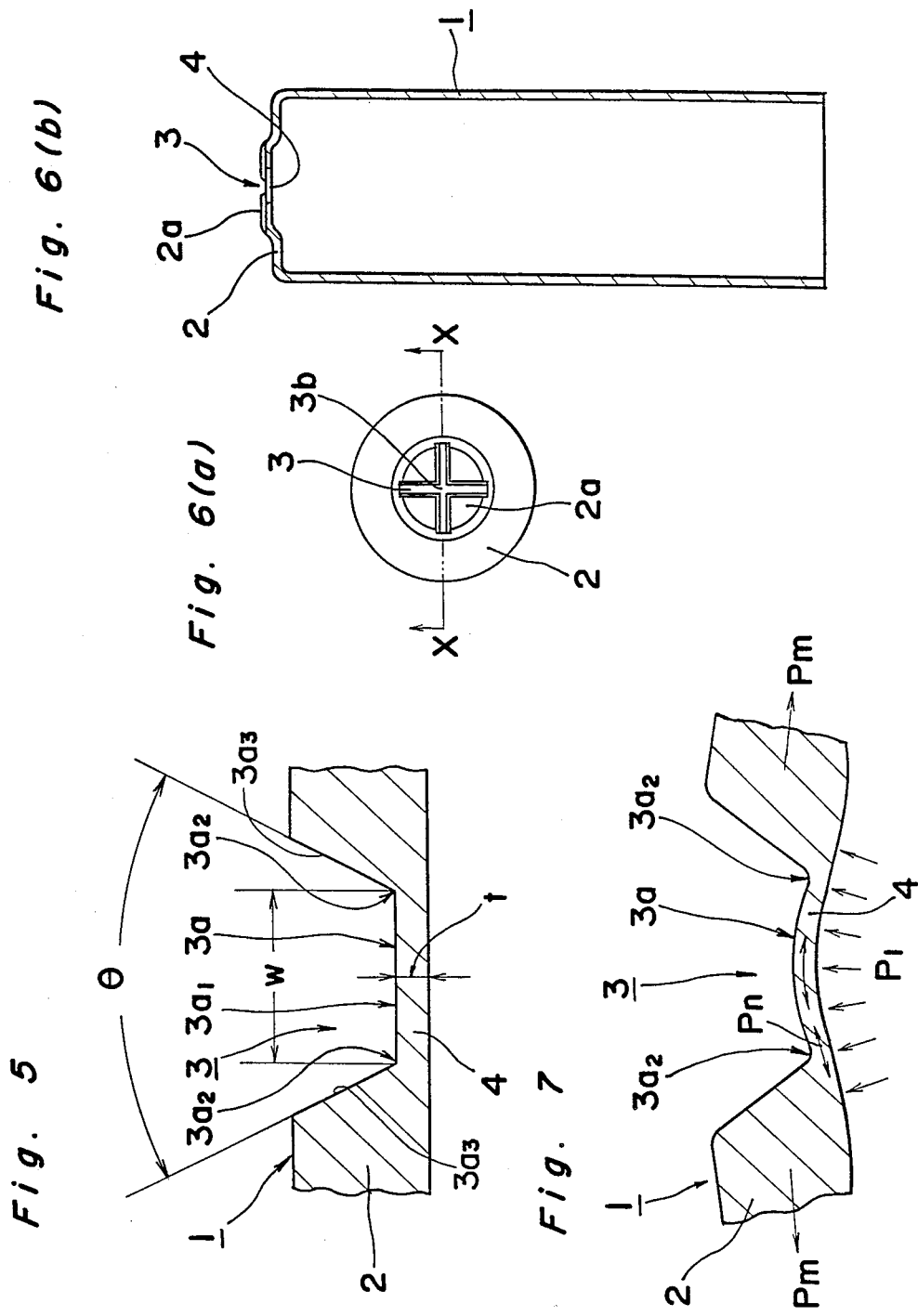

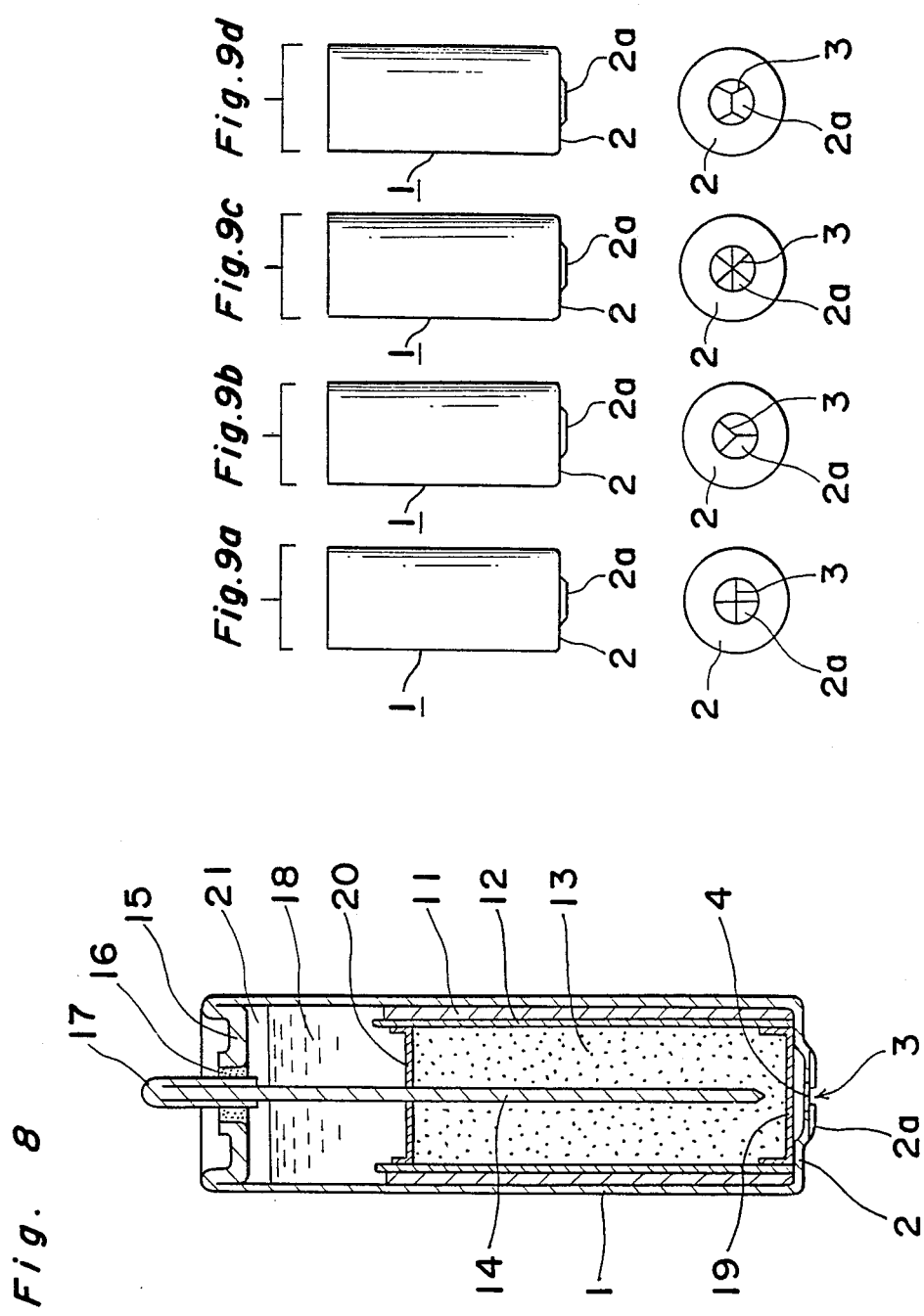

ratio of groove length B to external diameter A of battery container (B/A)

Fig. 15
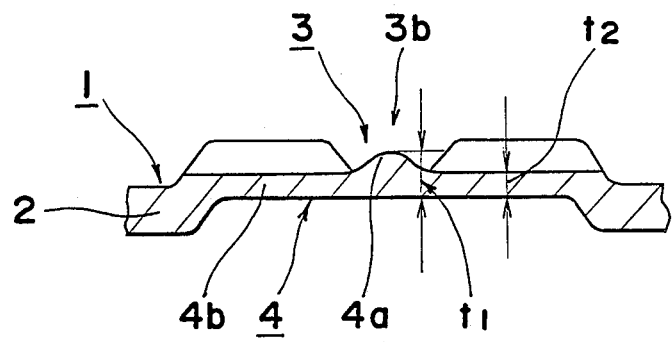
Fig. 16(a)
Fig. 16(b)
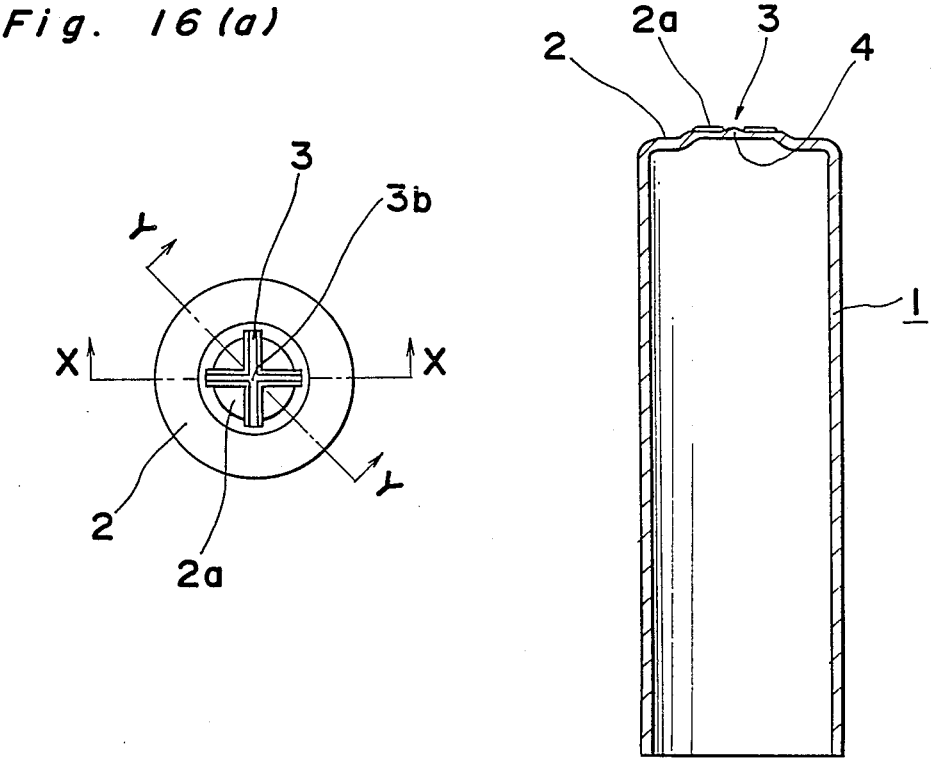

NON AQUEOUS ELECTROCHEMICAL BATTERY WITH EXPLOSION PROOF ARRANGEMENT AND A METHOD OF THE PRODUCTION THEREOF

BACKGROUND OF THE INVENTION

1. Field of the Invention

The present invention relates to a non-aqueous electrochemical battery of the sealed type with an explosion proof arrangement and a method or the production thereof.

2. Description of the Prior Art

In batteries, typically represented by thionyl chloride batteries, using alkaline metal such as lithium, sodium or potassium as a negative electrode with a positive electrode active substance of oxyhalide liquid such as thionyl chloride, sulfuryl chloride, phosphoryl chloride, and the like there have been used a completely seal structure wherein the battery container is sealed by a hermetic seal since the positive electrode active substance and alkali metal are easily reacted with water.

The batteries employing the hermetic seal are inherently provided with a good sealing performance and a good storage performance. However, in cases in which the batteries are subjected to a high temperature or any abnormal condition such as excessive high voltage charging, the inner pressure of the batteries readily becomes abnormally high by virtue of the good sealing performance, thereby resulting in a rupture of the batteries followed by the scattering of the contents of the batteries with a loud, noisy sound, staining the various equipment therearound.

In order to eliminate the drawbacks mentioned above, there is required in the liquid active substance batteries to adopt the form of a cruciform incision or groove on a bottom of the battery container as used in an alkaline battery having a high sealing performance so as to provide the explosion-proof structure. The cruciform groove used in the conventional alkaline battery is shaped in a V character shape with the bottom shaped in an acute angle or slightly rounded by 0.1 to 0.2 mm radius as disclosed in the U.S. Pat. No. 4,256,812.

However, the known cruciform groove mentioned above can not be applied to the a liquid active substance battery in view of the durability of a punch needed for defining the groove and explosion-proof performance, for the reason as mentioned below.

That is, as mentioned above, since the bottom corner of the groove in the conventional type is formed by an acute angle shape, in cases in which the groove is formed by a punching press, the male die for forming the groove is easily wasted, particularly in the liquid active substance cell, a high hard and high corrosion resistivity metal such as stainless metal is used as the battery container, the male die is wasted very easily, whereby there occur undesired variations of the shape of the bottom of the grooves due to the deformation of the male die by wasting, thus, the conventional groove used in the alkaline batteries can not be employed in the production of the liquid active substance batteries. On the other hand, in cases in which the bottom of the groove is rounded, the wasting of the male die may be decreased. However, there has been known that the effect of the groove under given tension load and bending load to a metal plate is affected by a ratio between a thickness of the round portion and roundness of the bottom of the groove. This effect is shown in the "strength design data book" committee of strength design data book, Syoukabou, published on June 1983. With the roundness of 0.1 mm R to 0.2 mm R of the bottom of the groove, it is easily estimated by referring the literature mentioned above that enough incision effect can not be expected.

Referring to FIG. 1, the thickness (T) of a battery container 1 is generally 0.2 mm to 0.5 mm. When an incision or groove 3 is defined on the bottom of the container 1, the thickness (t) of the bottom of the groove 3, i.e., a thinned portion 4 may be 0.03 to 0.08 mm with the roundness (R) of the bottom 3a 0.1 to 0.2 mm, therefore, the ratio (R/t) between the thickness of the bottom of the groove 3 and the roundness is about 1 to 7. Accordingly, it is difficult to expect a good incision effect of the groove. In addition, since the stainless steel has a good ductility, the effect of the incision is much decreased. This means that there does not occur the breakage of the bottom of the battery container within a safe pressure range unless the thinned portion 3a of the groove 3 is extremely thin. However, thinning of the bottom of the battery container causes the thinned portion 3a to be easily corroded and the ability of battery is lost.

Even if the explosion-proof arrangement is worked, the bottom of the battery is broken with only a small hole at the cruciform intersecting point of the grooves and gas is exhausted at most through the hole but the active substance and electrolyte stays in the container. In cases in which such conditions as mentioned above occurs in the liquid active substance battery, since the negative electrode constituting material such as lithium is dissolved by the temperature rise, an abrupt reaction between the lithium and the liquid substance occurs, there occurs battery reaction in the container in an instant in case the hole is closed by any member provided for separating the bottom portion of the battery, thereby resulting an explosion of the battery. As mentioned above, the conventional explosion-proof arrangement used in the alkaline battery is not directly applied to the liquid active substance battery and there is a strong requirement of developing a new explosion-proof arrangement suitable for the liquid active substance battery.

It is noted that one of the elements of initiating the explosion-proof arrangement is a pressure applied to an air chamber of the battery under a high temperature, and the first problem is in that it is difficult to obtain a good performance of the explosion-proof arrangement by merely selecting the shape of the recess of the groove and the thickness of the thinned portion.

For example, in case of a battery using thionyl chloride as the positive electrode active substance, there is few difference between the vapor pressure of thionyl chloride under a high temperature and that of water, but the cubic expansion coefficient of the former is $1 \times 10^{-3}$ deg$^{-1}$ which is greater about 5 times than that of the latter $0.207 \times 10^{-3}$ deg$^{-1}$. When the battery is subjected to a high temperature, the volume of thionyl chloride is expanded and the pressure in the air chamber is raised. It is noted that the pressure rise in the air chamber of the battery represented by a sum of the air pressure and vapor pressure of thionyl chloride is greatly changed depending on the volume of the air chamber designed at the time of manufacturing of the battery and the pressure rise is greater than that of the battery of aqueous electrolyte type such as alkaline battery. Accordingly, if the volume of the air chamber is not suitable, the explosion-proof arrangement may be operated under a normal condition and the function of the battery is lost.

The second problem is in that when the battery is subjected to a high temperature, the inner pressure of the battery changes as shown in FIG. 2, wherein the inner pressure increases abruptly for the pressure higher than 50 Kg/cm$^2$. FIG. 2 shows the relation between the inner pressure of the battery with the vertical axis and temperature with the horizontal axis. According to FIG. 2, the inner pressure increases abruptly from the temperature higher than about 170° C. and the inner pressure reaches 50 Kg/cm$^2$ at 180° C. In case the inner pressure exceeds 50 Kg/cm$^2$, the inner pressure much increases for a little temperature rise. Therefore, in case the battery is subjected to an abrupt temperature rising in case of fire, for example, even if the groove of the battery is broken, the speed of the pressure rise is faster than the speed of temperature falling due to breaking of the groove, then the inner pressure can not be lowered enough, the inner pressure is raised and in some cases, the battery is ruptured. The present inventors consider that this phenomenon occurs because, even if the groove is teared and opened, the size of an opening made by the tearing and opening of the grooves are so small that the opening is closed by a separating member for separating the content of the battery or positive electrode. As shown in FIG. 4(a), in case the width and area of the grooves are small, the phenomenon mentioned above occurs. Then in case the battery of which the speed of decrement of the inner pressure is slow is subjected to a quick temperature rise, the inner pressure of the battery is faster than the speed of the decrement of the inner pressure, the battery is ruptured.

In order to operate the explosion-proof arrangement satisfactorily, the length of the grooves of the battery is an important function. Thus the third problem is in that in case the groove of the battery is extremely short, the explosion-proof arrangement can not be operated and the battery is ruptured. On the other hand, in case the groove is extremely long, the explosion-proof arrangement is erroneously operated under a normal condition and the mechanical strength of the bottom of the battery is deteriorated, whereby the container of the battery is erroneously teared and opened by an external force.

The fourth problem is in that there is required that the explosion-proof arrangement is operable within a predetermined pressure range for assuring the safety of the battery making the critical operating pressure which tears and opens the explosion-proof arrangement as low as possible with the battery container formed thick.

The fifth problem is in that in case the grooves of the battery container are formed by a press method, the thinned portion of the groove is hardened due to press work, whereby the hardness of the thinned portion increases up to 450 to 550 of Vickers hardness. Thus the operating pressure of the thinned portion increases and the grooves are teared and opened at a pressure higher than a designated pressure i.e., the operation pressure of the explosion-proof arrangement becomes high, therefore, the designated safety is not guaranteed.

Besides, when the battry having the explosion-proof arrangement is installed on a print circuit board, the battery must be provided with one or more connection terminals on the bottom of the battery container on which the groove as the explosion-proof arrangement is formed. If a conventional connection terminal is installed to the bottom of the battery container, the thinned portion of the grooves is apt to be teared and opened and the ability of the explosion-proof arrangement is deteriorated. That is, in a conventional battery without explosion-proof arrangement, as shown in FIG. 3(a), a strip shape collector electrode 6 of the connection terminal 5 is bonded to a projected portion 2a formed on the central portion of the bottom 2 of the container 1. However, the conventional connection terminal as shown in FIG. 3(a) is mounted to the battery with the explosion-proof arrangement, the collector electrode 6 presses the thinned portion, which may be broken by the force applied by the collector electrode 6, thereby causing the inner substance in the battery to be leaked from the battery container 1. In addition, the collector electrode 6 covers the thinned portion and deteriorates the ability of the explosion-proof arrangement and there occurs a problem that the explosion-proof in a designated pressure range is not guaranteed.

SUMMARY OF THE INVENTION

An essential object of the present invention is to eliminate such various drawbacks that the battery is ruptured, generating a big noise and the contents of the battery are scattered to stain various equipments when the battery is subjected to a high temperature or the battery is charged with an excessive voltage.

Another object of the present invention is to provide a non-aqueous liquid electrochemical battery with an explosion-proof arrangement which is capable of preventing undesired rupture of the battery.

A further object of the present invention is to provide a non-aqueous electrochemical battery having an explosion-proof arrangement which is capable of assuring the explosion-proof operation for a pressure as low as possible so that the explosion of the battery can be prevented by a part of breakage of the battery container in the initial state of an abnormal pressure rise in a battery, causing the contents in the battery to be exhausted thereby assuring safety of the battery from the explosion.

A still further object of the present invention is to provide a non-aqueous electrochemical battery with a explosion-proof arrangement which is not operated under a normal use condition but is surely operated in the abnormal condition, thereby to assure a high safety.

The present invention is made to eliminate such a drawback inherent in the conventional battery that even a groove in an explosion-proof arrangement is teared opened, the opened portion is closed by a separator and a positive electrode, whereby the explosion-proof arrangement can not be operated, and has its object to provide a non-aqueous electrochemical battery with an explosion-proof arrangement which is surely operable even if there happens a rapid temperature rise in battery.

A still further object of the present invention is to provide a non-aqueous electrochemical battery which is not easily broken by an external force.

A still further object of the present invention is to increase the safety of a non-aqueous electrochemical battery by decreasing the hardness of the thinned portion for decreasing the operating pressure of the explosion-proof performance, solving such a problem that the hardness of the thinned portion of the explosion-proof arrangement becomes high due to press work and the operating pressure of the explosion-proof arrangement becomes higher than a designated pressure, so that the safety of the battery is deteriorated.

A still further object of the present invention is to provide a non-aqueous electrochemical battery with one or more connection terminals which are possible to prevent either breaking of the thinned portion of the explosion-proof arrangement at the time of mounting the terminals to the battery container and deterioration of the explosion-proof performance due to mounting of the connection terminals to the battery container, solving such a problem that the conventional connection terminal causes the explosion-proof arrangement to be damaged at the time of mounting of the terminals to the battery container.

A still further object of the present invention is to solve such a problem that the life of a punch or male die for shaping the grooves of the explosion-proof arrangement is short and lacks high productivity and therefore the present invention has its object to provide an explosion-proof arrangement having such grooves that enable to extend the life of the punch so as to realize a mass production of the battery containers with the grooves of the explosion-proof arrangement even if the groove comprises a flat bottom.

A still further object of the present invention is to enable to manufacture the battery containers without a defect in terms of a total height and any troubles in an assembling process of the batteries.

In the non-aqueous liquid electrochemical battery according to the present invention, there is provided a plurality of grooves incised on the bottom of the battery container so as to provide a thinned bottom in each groove with the inner surface of the thinned bottom formed flat so that the respective corners of the groove where both edges of the flat thinned bottom and both walls of the grooves intersect are subjected to a tension force due to the inner pressure in a radius direction in the battery and a further tension force due to bending. By this structure, the bottom of the battery container can be teared and opened at at least one of the corners of the groove by a relatively low pressure even if the bottom of the groove is made relatively thick so as to provide a safe explosion-proof arrangement.

In the present invention, in order to accomplish the explosion-proof performance, more than two grooves each having the flat bottom which is continued to side walls with keenly bent corners are provided in such a manner that each groove intersects with other groove at least at one point. By arranging the respective grooves as mentioned above, the inner pressure in the battery is concentratedly applied to the intersecting point or points, the explosion-proof arrangement can be operated corresponding exactly to the pressure rise in the battery.

In a preferred embodiment, the width of the flat bottom of the groove is about 1.4 to 15 times of the thickness of the thinned bottom.

The shapes of the grooves in a cross sectional view and top plan view are explained with reference to the attached drawings. The shape of each groove in cross section is shown in FIG. 5, wherein the bottom $3a$ of the groove 3 is flat as shown in $3a_1$. The width W of the flat portion $3a1$ is about 1.4 to 15 times of the thickness (t) of thinned portion 4. The angle $\theta$ of walls $3a_3$ of the groove 3 is usually 50° to 80°. The corners of both side edges of the bottom $3a$ and the walls $3a_3$ are keenly bent. When the inner pressure of the battery is applied to the thinned portion 4, both edges $3a_2$ of the groove 3 are subjected to a first tension force (Pm) due to the inner pressure (Pl) in the battery in the radius direction and a second tension force (Pn) due to bending of the bottom portion, whereby the corners $3a_2$ where the bottom or thinned portion 4 and the walls $3a_3$ intersect are teared and opened. Since the groove 3 is apt to be teared and opened by the pressure rise in the battery, even if the thinned portion 4 is thick more or less, the explosion-proof arrangement can be operated at relatively low pressure and it is possible to eliminate the deterioration of the performance of the battery which is caused by corrosion of the thinned portion by thinning the bottom of the groove. In addition, since the dispersion of the thickness of the thinned portion 4 is decreased, the dispersion of the operating pressure of the explosion-proof arrangement can be decreased.

The range of the ratio between the width (W) of the flat portion $3a_1$ and the thickness (t) of the thinned portion 4 is taken 1.4 to 15, this is because in case the ratio of (W/t) is smaller than 1.4, bending of the thinned portion 4 becomes difficult, whereby the thinned portion 4 is not easily bent by the pressure rise in the battery, resulting in difficulty of tearing and opening of the groove 3 because of the decrement of the tension force (Pn) due to decrement of the force applied to the both edges $3a_2$. While the ratio (W/t) exceeds 15, it becomes difficult to shape the groove 3 because of increment of the load applied to a punch to form the groove.

In the embodiment of the present invention, stainless steel plate is used as the battery container for resisting the strong corrosion property of the positive electrode active substance, the thickness of the stainless steel plate is set by 0.2 to 0.5 mm.

The thickness t of the thinned portion 4 is 0.03 to 0.08 mm thick with the ratio (W/t) of 1.4 to 15 and the width of the flat portion $3a_1$ of the thinned portion is 0.09 to 0.5 mm.

The operating pressure of the explosion-proof arrangement at which the groove 3 is teared and opened can be widely selected depending on the kind of the battery.

In the non-aqueous electrochemical battery according to the present invention, since operating pressure of the sealing portion of the battery is very high, the operating pressure of the explosion-proof arrangement can be selected as 30 to 125 kg/cm$^2$. In the non-aqueous electrochemical battery with the hermetic seal without explosion-proof arrangement, the explosion of the battery occurs at a pressure higher than 250 kg/cm$^2$, it is possible to select the operating pressure of the explosion-proof arrangement about 125 kg/cm$^2$ as an upper limit. It is noted that even if the operating pressure is such high as mentioned above, there is not any danger. Under the normal use condition, the inner pressure of the battery scarcely reaches higher than 10 kg/cm$^2$. Therefore, the operating pressure of the explosion-proof arrangement may be chosen higher than 30 kg/cm$^2$ even considering the dispersion of the actual operating pressure and corrosion of the battery container due to long time use. By setting the operating pressure as mentioned above, the explosion-proof arrangement does not operate erroneously so long as the battery is in the normal use condition.

The operating pressure of the explosion-proof arrangement according to the present invention can be defined by the material of the battery container and the thickness of the thinned portion 4 of the groove 3. However, according to the present invention, the operating pressure can be varied by choosing the ratio (W/t) between the width (W) of the flat portion $3a_1$ and the thickness t of the thinned portion 4. In the present invention, both of the edges $3a_2$ of the thinned portion 4 are teared and opened when the inner pressure of the battery is raised by acting the first force due to the inner pressure and the second force due to bending, the breaking area where the tearing and opening of the thinned portion occurs is wide, so that it is possible to discharge not only the inner gas of the battery but also the battery substance such as positive electrode active substance, even if the battery is rapidly heated under a high temperature, the explosion of the battery can effectively prevented.

As the shape of the grooves in plan view, as shown in FIG. 9, there may be used a cruciform or X character form, Y character form, asterisk form or H character form. When there occurs an inner pressure in the battery, since the deformation is the largest at the central operation of the bottom of the battery container, there may be preferably used one of the cruciform, Y character form, asterisk form having the intersection point $3b$ at the center portion.

It is not essential that the grooves intersect at the intermediate portion, but there may be used such a configuration that the ends of the grooves are connected each other as Y character form. In the present invention, the grooves or incisions are formed on the bottom of the battery container because the bottom of the battery container is easiest to be deformed when the inner pressure is raised, that is the explosion-proof can be performed best exactly corresponding to the inner pressure rise of the battery.

Since the grooves are usually formed by the press method, the shape of the groove in cross sectional view is normally a reversed trapezoid shape or generally U character. The angle $\theta$ between the two side walls is 50° to 80°. In case the angle $\theta$ is smaller than 50°, when forming the groove, a tension stress applying to the material forming the bottom of the groove is insufficient, whereby a load applied to the punch is excessive and formation of the groove is difficult. With the angle $\theta$ larger than 80°, a resistance of the thinned portion against the inner pressure by the pressure rise in the battery becomes high, whereby it is difficult to manufacture batteries having a good explosion performance. Usually, the grooves are formed on the outer surface of the bottom of the battery container, however, the grooves may be formed inner surface of the bottom of the battery container.

The bottom portion of the grooves is not only exactly flat but also may be substantially flat.

The present inventors studied the relation between the volume and pressure of the air chamber of the battery which is normally provided at the upper portion of the battery and the battery according to the present invention has been provided with a highly safe explosion-proof performance preventing operation of the explosion-proof arrangement under the normal use state of the battery by defining either the volume of the air chamber 7.5% to 15% of the total volume of the battery and the shape of the grooves which forming the thinned portion.

In the present invention, the volume of the air chamber in the battery is defined 7.5% to 15% of the total volume of the battery according to an experimental result mentioned below.

FIG. 10 shows the relation between the inner pressure of the air chamber and temperature of the thyonyl-chloride lithium battery of UM-3 type with 14 mm outer diameter and 52 mm height when the volume of the air chamber is changed. The air chamber (see 21 in FIG. 10) is provided in the upper portion of the battery, although the detail of the battery is described later.

There are shown in FIG. 10, relations between the inner pressure and temperature of the air chamber changing the volume of the air chamber as 400 $\mu$l, 450 $\mu$l, 500 $\mu$l, 550 $\mu$l, 600 $\mu$l, 700 $\mu$l, 750 $\mu$l, 800 $\mu$l, 850 $\mu$l and 900 $\mu$l, wherein the temperature to reach the same pressure increases as the volume of the air chamber increases.

It is understood from FIG. 10 that the operation temperature at which the explosion-proof arrangement operates changes greatly depending on the volume of the air chamber even if the operating pressure is set by a predetermined pressure regulating the thinned portion of the explosion-proof arrangement. In case of the volume of the air chamber of 400 $\mu$l the inner pressure of the air chamber with 120° C. reaches 300 kg/cm$^2$, the explosion-proof arrangement must be operated under 120° C., considering that the battery container is ruptured at a pressure of 200 to 300 kg/cm$^2$ (since the sealing portion of the battery is made hard, without the explosion-proof, the battery container per se is ruptured). However, since the battery of the kind is operable with 120° C., thus it is not desired that the explosion-proof arrangement is operated at 120° C.

With the volume of the air chamber of 450 $\mu$l the inner pressure at the temperature of 120° C. is about 15 kg/cm$^2$, so that by setting the explosion-proof arrangement to be operable at about 15 kg/cm$^2$, the explosion-proof arrangement can operate under the normal use condition. Thus, battery can be operated normally so long as the inner pressure is normal.

The inner pressure of the battery at 20° C. is about 1.3 kg/cm$^2$, and at 100° C. the inner pressure is 3 to 4 kg/cm$^2$.

FIG. 11 shows the relation between the volume of the air chamber and either the quantity of electricity charged in the negative electrode (lithium) and quantity of electricity dicharged therefrom.

The horizontal axis in the graph shown in FIG. 11 represents the volume of the air chamber in the battery and the vertical axis represents the quantity of electricity wherein the real line shows the quantity charged in the negative electrode and the dotted line shows the discharged quantity of electricity. In this battery, the discharged electric quantity corresponds to 93% of the charged electric quantity.

It is necessary, by the request of users of the battery as to UM-3 type thionyl chloride lithium battery, to maintain more than 2,000 mAh of the dischargeable electricity quantity. Thus in order to maintain more than 2,000 mAh electricity quantity, the volume of the air chamber must be less than 900 $\mu$l as understood by FIG. 11.

From the foregoing, it can be said that the necessary volume of the air chamber is 450 to 900 $\mu$l. Since the total volume of the battery is 6 ml, the required volume of the air chamber of 450 to 900 $\mu$l corresponds to 7.5% to 15% of the total volume of the battery.

Discussing the operating pressure of the explosion-proof arrangement, in case of the battery whose air chamber is 450 $\mu$l that is the lowest limit volume of the air chamber, in order for the explosion-proof arrangement to be correctly operated in the temperature higher than 120° C., the operating pressure is about 15 Kg/cm$^2$, as understood from FIG. 10, however, in order to increase the safety, it is preferred to set the operating pressure higher than 20 Kg/cm$^2$. Thus it can be considered suitable that the operating pressure of the explosion-proof arrangement is in the range of 20 to 200 Kg/cm$^2$.

In order to set the operating pressure of the explosion-proof arrangement as 20 to 200 Kg/cm$^2$, it is necessary to select the suitable thickness of the thinned portion of the explosion-proof arrangement.

FIG. 12 represents a relation between the thickness of the thinned portion when the explosion-proof arrangement is formed in the grooves 3 of the cruciform with the thinned portion 4 formed and the operating pressure of the explosion-proof arrangement at which the thinned portion is broken when the pressure is applied from the inside of the battery container toward the outside.

The horizontal axis of the graph in FIG. 12 represents the thickness of the thinned portion and the vertical axis represents the operating pressure of the explosion-proof arrangement. As shown in FIG. 12, the operating pressure is 20 Kg/cm$^2$ for the thickness of 45 μm of the thinned portion and the operating pressure is 200 Kg/cm$^2$ for 120 μm thick of the thinned portion, thus in order to enable the explosion-proof arrangement in the pressure range of 20 to 200 Kg/cm$^2$, the thickness of the thinned portion may be 45 to 120 μm. In order to operate the explosion-proof arrangement for the pressure range of 50 to 100 Kg/cm$^2$, the thinned portion may be preferably 60 to 90 μm thick.

In order to prevent the defect that, when the thinned portion of the explosion-proof arrangement is broken, the break portion or opening is closed by the contents of the battery and the explosion-proof arrangement can not be operated well, the present inventors have discussed the area of the thinned portion, whereby in the explosion-proof arrangement in the present invention, the total area of the thinned portion is set as 0.7 to 5.2% of the area of the bottom of the battery container so that, the explosion-proof arrangement can be operated successfully even if the battery is subjected to a rapid temperature raise.

As shown in FIG. 4(b), in case the width of the thinned portion 4 is large, i.e., the area of the thinned portion is large, the opening formed by tearing and opening of the thinned portion is large, whereby it becomes possible to decrease such a chance that the opening at the thinned portion is closed by the content of the battery, and therefore, the explosion-proof arrangement can be operated successfully.

The present inventors have studied the size of the thinned portion of the explosion-proof arrangement relative to the total area of the bottom of the battery container and have specified it more than 0.7% of the total area of the bottom of the battery container. However, in case the area of the thinned portion is too large, the operating pressure of the thinned portion increases, whereby there may not occur such tearing and opening of the thinned portion at the desired pressure. That is, the thinned portion of the explosion-proof arrangement is teared and opened through such processes that the bottom of the battery container is expanded when the inner pressure of the battery is increased, then the tension force and bending force due to the inner pressure rise are applied to one or more ends of the bottom of the grooves, whereby the thinned portion is teared and opened at one more ends thereof. In this processes, in case the width of the thinned portion is large, the stress applied to the ends of the thinned portion may be divided to decrease the force for breaking the thinned portion and the thinned portion is not teared and opened. Therefore, according to the present invention, the upper limit of the area of the thinned portion is set as 5.2% of the total area of the bottom of the battery container.

According to the present invention, the length of each groove is limited as 29 to 71% of the outer diameter of the battery container so that the explosion-proof arrangement can be operated in a stable manner preventing undesired rupture of the battery container by an erroneous operation of the explosion-proof arrangement and by the external force under the normal use condition.

According to the study by the present inventors, there has been found that the operating pressure of the explosion-proof arrangement changes corresponding to the ratio between the length of each groove and the outer diameter of the battery container. That is even if the thickness of the thinned portion is equal, in case the length of the groove is short, the operating pressure is high and in case the groove is long, the thinned portion may be teared and opened at a low pressure.

According to the present invention, the thickness of the thinned portion at a point where the grooves intersect (referred to as intersection point hereinafter) is set 1.05 to 1.5 times of the thickness of the thinned portion at any other portion other than the intersection of the grooves so that when the inner pressure of the battery is increased, the tension forces due to either the inner pressure and the bending can be further effectively applied to one or more ends of the bottom of the grooves, whereby the thinned portion can be broken widely with a relatively low pressure, and the explosion-proof arrangement can be operated in a range of such a pressure that the safety of the battery in the initial condition of the pressure rise in the battery can be assured even if the thinned portion of the groove is relatively thick.

In case the thickness of the intersection point is less than 1.05 times of the thickness of the other portion, there may be deteriorated the effect of the effect of breaking the thinned portion at the end of the groove near the intersection point with a low pressure. To the contrary, in view of manufacturing work, it becomes difficult to make the thickness at the intersection point more than 1.5 times of the thickness of the other portion, although it may be effective for the tearing and opening of the thinned portion at the low pressure to make the intersection portion more than 1.5 times of the thickness of the other portion.

According to the present invention, in order to lower the hardness of the thinned portion which is once hardened by work hardening by press work for forming the grooves on the bottom of the battery container, the thinned portion of the grooves of the explosion-proof arrangement is annealed after the thinned portion is shaped so that the hardness of the thinned portion can be lowered to vickers hardness of 150 to 240 vickers hardness for lowering the operating pressure of the thinned portion, thereby resulting in lowering the operating pressure of the explosion-proof arrangement.

The anneal is performed by heating the battery container with the the grooves already formed in either vacuum or inert gas such as argon gas or nitrogen gas with 850° C. to 1100° C. for 15 to 30 minutes then being cooled gradually. By performing the anneal in the vacuum or inert gas, the battery container can be prevented from being oxidized.

The hardness of the thinned portion is selected as 150 to 240 vickers hardness because the hardness of the battery container made of stainless steel before formation of the grooves is about 150 vickers hardness at lowest, to the contrary, with the hardness higher than 240 vickers hardness the operating pressure of the explosion-proof arrangement may exceeds 150 Kg/cm² in case the thinned portion of the groove is formed thick as desired.

If the operating pressure of the explosion-proof arrangement is too low, the explosion-proof arrangement may be erroneously teared and opened by a pressure which may occur in the normal use condition, thereby resulting in loss of the battery performance. If the operating pressure is too high, the safety of the explosion-proof arrangement lacks, therefore the operating pressure of the explosion proof arrangement is selected normally 30 to 150 Kg/cm² preferably in order to assure practical use and safety, the pressure is selected as 60 to 110 Kg/cm². In order to assure the operation of the explosion-proof arrangement with the operating pressure as mentioned above, the thickness of the thinned portion is 45 to 120 μm, especially 80 to 90 μm.

According to the present invention, the connection terminal is formed in a ring shape or a partly cut ring shape, which is bonded to a peripheral edge portion of the bottom of the battery container. By securing the connection terminal to the battery container as mentioned above, there can be obtained the battery having the explosion-proof arrangement and the connection terminal without badly interfered by the connection terminal.

According to the present invention, the bottom of the battery container is pressed to form the grooves of the explosion-proof arrangement using a punch or male die having a projection with an angle of 50° to 80° for forming the groove without applying any restraining force, in a direction of the thickness of the bottom of the battery, to the material of the bottom of the battery container where non of the grooves is formed. The groove is formed by pushing the projection of the punch in the bottom material of the battery container applying the tension stress to the bottom of the grooves so as to form the groove having the flat bottom in the bottom of the battery container made of stainless steel with a relatively low punching load.

In general, the forging or coining by the press is performed the disllacement of the material due to the plastic flow of the material and the inner structure in the material shows the fiber flow (the fiber structure generated by the plastic flow). In this case, the necessary force for the press forming is a force overcoming deformation resistance of the material and the friction force against a pressing tool. Both of the deformation resistance and the friction force against the tool are applied to the tool. Therefore, in case the material is hard, having a high corrosion resistivity such as stainless steel, in order to perform coining wide and deep the load per unit area is great despite of the groove shaping work.

Thus according to the present invention, in order to minimize the deformation resistance of the battery container and the friction force between the material and punch, the angle of the projection of the punch for forming the groove is selected as 50° to 80° under such condition that no constrain force in the direction of the thickness of the bottom of the battery container is applied. By the arrangement mentioned above, the durability of the punch can be improved. According to the conventional way, in order to shape the groove having a flat bottom, there has been required the load of the punch more than 300 Kg/cm². However, according to the present invention, the groove with the flat bottom can be shaped with the load of the punch less than 240 Kg/cm² using general lubricant oil.

In order to press without any constrain force, the base portion of the punch for forming the groove must not contact with the battery container. Therefore, the height of the projection of the punch must be higher than the depth of the groove to be shaped. Especially in order to press the groove without constrain force, the height H (see FIG. 23) of the projection of the punch is preferably greater than 1.5 (T−t) wherein T is the thickness of the bottom of the battery container and t is the thickness of the thinned portion of the groove.

The angle $\theta$ of the projection of the punch is selected 50° to 80° because in case the angle is less than 50°, the tension stress applied to the material by which the bottom of the battery container is formed is insufficient and the load of the projection of the punch becomes high. With the ange $\theta$ more than 80°, the resistance of the groove against the pressure which is generated by the pressure rise in the battery and applied from the inside of the battery becomes high, the explosion-proof ability is deteriorated.

BRIEF DESCRIPTION OF THE DRAWINGS

FIG. 3 shows a sealed battery with lead terminal having no device for preventing explosion, wherein FIG. 3(a) is a front view of an essential part thereof and FIG. 3(b) is a bottom plan view thereof, FIG. 4 are sectional views showing models when thin portions for preventing explosion formed on bottom of container of battery are teared and opened, wherein FIG. 5 is an enlarged sectional view showing a groove portion for safe and explosion preventing formed on the bottom portion of the container of battery according to the present invention, FIG. 6 shows a handstand container of battery according to the present invention, wherein FIG. 6(a) is a front view thereof and FIG. 6(b) is a sectional view along the line X—X in FIG. 6(a), FIG. 7 is an enlarged sectional view showing the groove portion in FIG. 5 undergoing an internal pressure of the battery, FIG. 8 is a sectional view showing a thionyl chloride lithium battery adopting a container of the battery shown in FIGS. 5 and 6, FIGS. 9(a) to 9(d) are schematic plan views showing the grooves of the container of battery according to the present invention, wherein the views in the upper portion are schematic front views of the container of battery and the views in the lower portion are schematic bottom views respectively, FIG. 15 is an enlarged sectional view showing a groove portion on the thin portion in the bottom of the container of the battery used in an example according to the present invention, FIG. 16 shows a handstand container of battery used in a battery according to the present invention, wherein FIG. 16(a) is a plan view thereof and FIG. 16(b) is a sectional view along the line X—X in FIG. 16(a), FIG. 21 shows an example of a safe and explosion preventing sealed type battery having a lead terminal according to the present invention, wherein FIG. 22 shows another example of a lead terminal used in a battery according to the present invention, wherein

DETAILED DESCRIPTION OF THE PREFERRED EMBODIMENT

EXAMPLE 1

Figure 1:
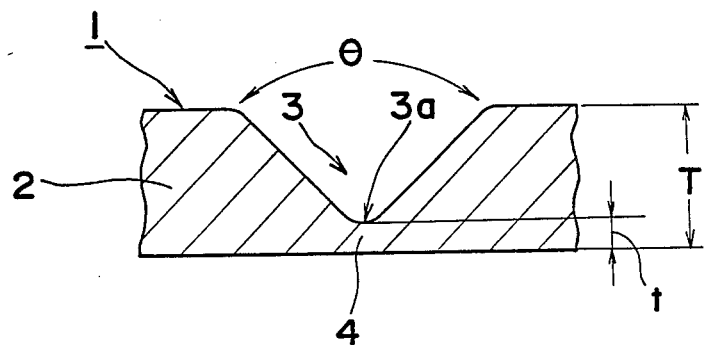
FIG. 1 is an enlarged sectional view showing a groove portion for safe and explosion preventing of an alkaline battery.

Next, the preferred embodiments of the present invention will be explained with reference to the drawings.

As shown in FIG. 6, a container of battery 1 has a bottom portion and is cylindrical shaped (since the container of battery 1 is handstanding in FIG. 6, the bottom portion 2 is shown in the upper portion of the container 1), wherein a groove 3 of cruciform in plan view is formed on a convex portion 2a at the center portion of the bottom portion 2 as shown in FIG. 6(a). As shown in FIG. 5, the groove 3 is handstanding trapezoid shaped in sectional view having a flat bottom part 3a, and the ratio of the width W of the flat spot 3a, of the groove bottom part 3a to the thickness t of the thin portion 4 provided by forming the groove 3 is made 1.4 to 15 as mentioned above.

The container of battery 1 is usually made by means of a diaphragm process of stainless steel plate of 0.2 to 0.5 mm thick, having the width W of the flat spot $3a_1$ of the groove bottom part 3a generally made 0.09 to 0.5 mm and the thickness t of the thinned portion 4 generally made 0.03 to 0.08 mm and the groove forming angle $\theta$ generally made 50 to 80 degrees. In this example, since the convex portion 2a is provided in the center portion of the bottom portion 2 of the container 1 in order to facilitate the selection of the position where the lead terminal is attached, the groove 3 is formed in the convex portion 2a, but the convex portion 2a is not always necessary and the bottom portion 2 of the container 1 may be flat. In case the groove 3 is formed in the center portion of the flat bottom 2 of the container 1, the function of preventing explosion is not lowered specifically compared with the case of forming the groove 3 on the convex portion 2a.

The battery container 1 is adopted to a thionyl chloride lithium battery as shown in FIG. 8 for example and when the internal pressure of the battery is increased after assembling the battery, in the container 1 having a groove 3 for preventing explosion formed, as shown in FIG. 7, a tensile force Pm caused by the internal pressure and a tensile force Pn caused by bending the thin portion are mixedly applied to the edge portions $3a_2$ of the groove bottom part 3a due to the internal pressure Pl of the battery, whereby the edge portions $3a_2$ of the groove bottom part 3a are teared and opened.

FIG. 8 shows a thionyl chloride lithium battery employing a battery container shown in FIGS. 5 and 6, wherein reference numeral 1 denotes a battery container having a groove 3 formed for preventing explosion. Numeral 11 denotes a cathode made of alkaline metal, which is formed on the inner surface of the container 1 by pressing a lithium plate thereon in this example, therefore, in this battery, the container 1 has a function as a cathode terminal. Numeral 12 denotes a separator which is made of glass fiber non-woven fabric and is cylindrical shaped, separating the cylindrical cathode 11 from the cylindrical anode 13. The anode 13 is formed of carbon porous mold made of amorphous carbon mainly including acetylene black, and numeral 14 denotes an anode collector made of stainless steel rod. Numeral 15 denotes a battery lid made of stainless steel whose outer limb portion rising up is connected to the opening edge portion of the container 1 by welding, and there is provided a glass layer 16 between the inner limb portion of the battery lid 15 and the anode terminal 17. The glass layer 16 insulates the battery lid 15 from the anode terminal 17 and the outer limb surface of the glass layer 16 is bond by melting to the inner limb surface of the battery lid 15 and the inner limb surface of the glass layer 16 is bonded by melting to the outer limb surface of the anode terminal 17, whereby the opening of the container 1 is closed by sealing between the battery lid 15 and the anode terminal 17, so called a hermetic sealing. The anode terminal 17 made of stainless steel is pipe shaped when assembling the battery, which is used as a pouring entrance, for the electrolyte whose top portion is sealed by welding with the upper portion of the anode collector 14 which is inserted in the empty portion after pouring the electrolyte. Numeral 18 denotes the electrolyte which is made of thionyl chloride containing aluminum lithium tetrachloride of 1.2 mol/l solution, that is to say, the aforementioned thionyl chloride is not only the electrolyte solvent but also the anode active material in this battery, and there occurs an reaction between the thionyl chloride and lithium ion ionized from the cathode 11. Numerals 19 and 20 respectively denote a bottom separating member and top separating member made of glass fiber non-woven fabric.

The single three type thionyl chloride lithium battery having a groove of cruciform shaped in plan view and handstanding trapezoid shaped in sectional view formed in the bottom portion of the container as mentioned above, is put into fire and the results whether or not the battery is burst with a big burst sound, are shown in Table 1. Moreover, the results of the operation experiments of the function for preventing explosion adopting air pressure into the container having a groove of handstanding trapezoid shaped in sectional view formed in the bottom portion of the container, are also shown in Table 1. When in the experiment burst in fire and the experiment of the function for preventing explosion, the width W of the flat spot 3a, of the groove bottom part 3a was varied to be 0.09 mm, 0.15 mm, 0.3 mm and 0.5 mm, and the thickness t of the thin portion 4 was varied to be 0.03 mm, 0.035 mm, 0.045 mm, 0.065 mm and 0.08 mm. Where the battery container was made of stainless steel and the thickness of the container was 0.3 mm and the groove forming angle $\theta$ was constant 60 degrees. Moreover, in case of forming a groove having a roundness formed at the bottom part as adopted to an alkaline battery, the results of the experiment burst in fire and the results of the experiment of the function for preventing explosion are also shown in Table 1. In Table 1, the denominators in the column of Number of Batteries Burst in Fire represent the number of the batteries applied to the experiment, the numerators represent the number of the batteries burst in fire (i.e., in case the function for preventing explosion is not operated so that the battery is burst with a high pressure and an explosive). The groove was formed by pressing molding, and subsequently the groove was annealed at the temperature of 1010 degree for ten minutes in order to remove the work hardening due to the groove forming.

As shown in Table 1, even though the thickness t of the thin portion is same, the working pressure can be lowered by changing the width W of the flat spot of the groove bottom part. Therefore, the setting working pressure can be lowered keeping the thin portion comparatively thick. Even in case the thickness of the thin portion is 0.08 mm, though the working pressure is so large that the rupture in fire occurred when the value W/t is 1.1 (Sample No. 13), the ruptured in fire does not occur when the value W/t is 1.9 (Sample No. 12). Therefore, the function for preventing explosion of the battery can be varied by changing the value W/t. In addition, in case the value W/t is 1.4 (Sample No. 10), the rupture in fire did not occur.

In the Sample No. 14 to 19 having the roundness formed in the groove bottom part, the working pressure is high compared with the battery according to the present invention whose groove bottom part is flat even though the thickness of the thin portion is same, and even in the Sample No. 14 of 108 kg/cm$^2$ working pressure and the Sample No. 17 of 95 kg/cm$^2$ working pressure, the rupture in fire occurred. This is because, in an alkaline battery since the active material is not melted so long as the active material does not become very high temperature, the rupture of the battery can be prevented by discharging the gas which causes the rupture of the battery by tearing and opening the thin portion when the internal pressure of the battery is raised up by putting the buttery into fire. However, in a thionyl chloride lithium battery, the melting point of lithium is low of approximately 186° C., the lithium in the cathode is easily melted by putting the battery in fire, and even though the thin portion is teared and opened and the gas is discharged, the opened hole in the thin portion is closed with the separating member of the bottom portion and the separator and the thionyl chloride, the active material of the anode, is partially remained, and under this condition, which reacts suddenly with the melted lithium so as to raises the internal pressure in a moment so that the rupture of the battery occurs in the high pressure even after the internal gas is discharged through the opened thin portion.

Moreover, though the groove is formed to be cruciform shaped (X character shaped) in plan view in this example, the groove may be formed to be not only cruciform but also Y character shaped as shown in FIG. 9.

EXAMPLE 2

With reference to the knowledge mentioned above, the battery containers were made, having the thin portions for preventing explosion formed of 30 $\mu$m, 70 $\mu$m, 120 $\mu$ and 150 $\mu$m thick variously.

Using the five kinds of containers mentioned above, five kinds of thionyl chloride lithium battery having the volumes of the air chambers of 400 $\mu$l, 450 $\mu$l, 650 $\mu$l, 900 $\mu$l and 950 $\mu$l were made.

The structure of the battery mentioned above is shown in FIG. 8 and each of the constitutional members is similar to that in the Example 1, wherein the groove forming angle $\theta$ is made 60 degrees, reference numeral 4 denotes a thin portion which is formed in the cruciform shape on the bottom portion 2 of the container 1 by forming the groove 3. The width W of the thin portion 4 is made 0.15 mm and the thickness t thereof is varied to be 30 $\mu$m, 45 $\mu$m, 70 $\mu$m, 120 $\mu$m and 150 $\mu$m in accordance with the container as described above. These batteries are heated from the room temperature to 500° C. in a temperature up speed of 20° C. per minute and the condition of the function for preventing explosion was examined, showing the results thereof in Table 2. In Table 2, X marks represent that the function for preventing explosion was not worked so as to rupture the battery, Δ marks represent that the function for preventing explosion was worked at the temperature lower than 120° C., and ° marks represent that the function for preventing explosion was worked at the temperature higher than 120° C.

Figure 10:
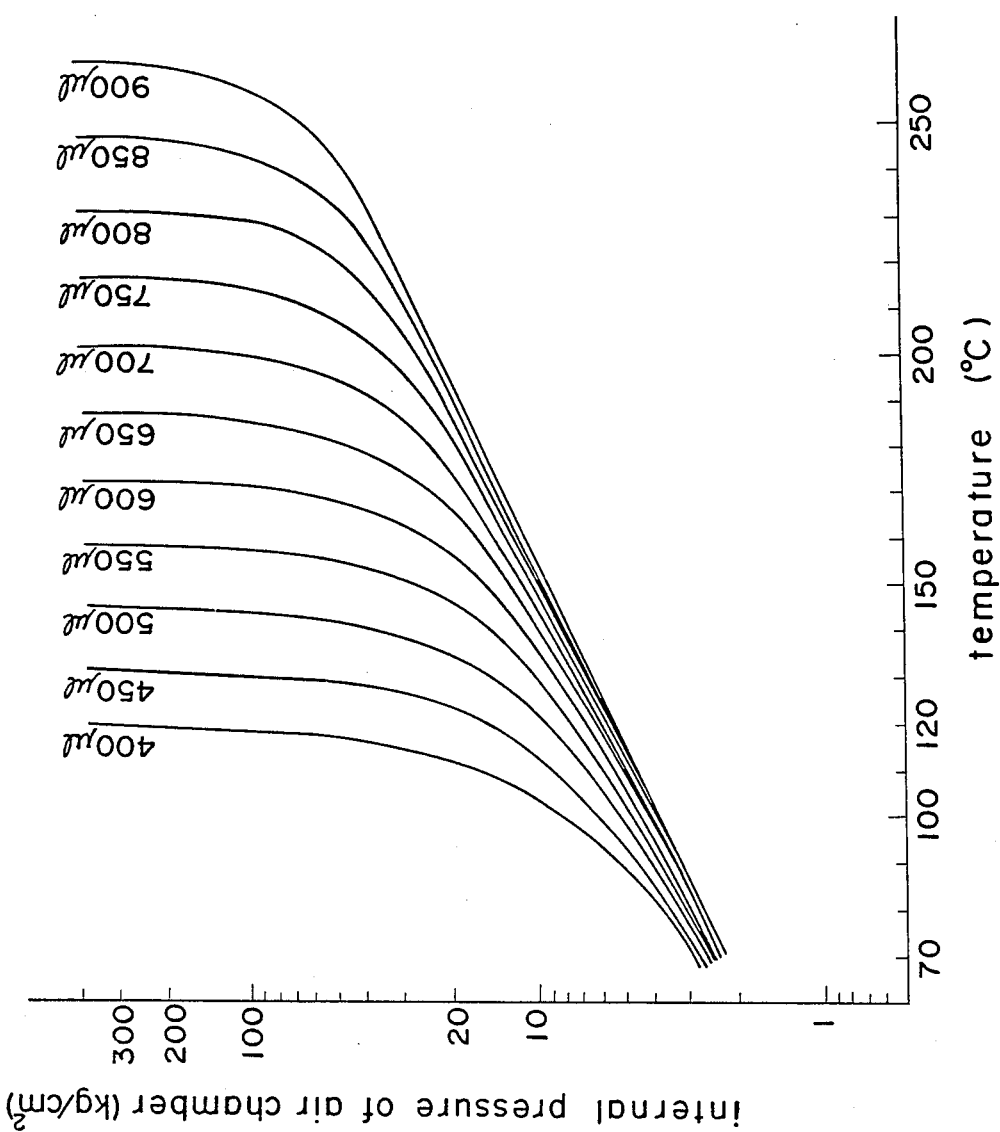
FIG. 10 is a graph showing a relationship between the internal pressure and the temperature in the air chamber when the volume of the air chamber is varied in a thionyl chloride lithium battery of single three type.
Figure 11:
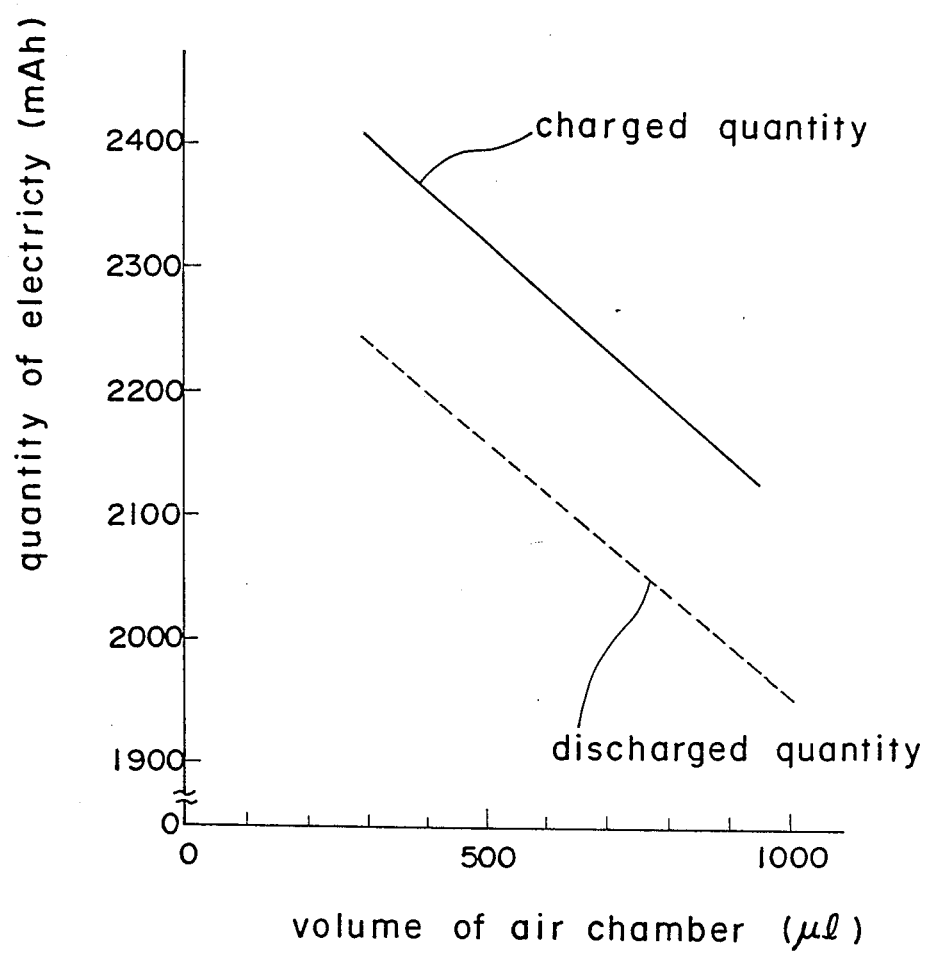
FIG. 11 is a graph showing a relationship between the volume of the air chamber and the charged and discharged quantities of the cathode in the thionyl chloride lithium battery of single three type.
Figure 12:
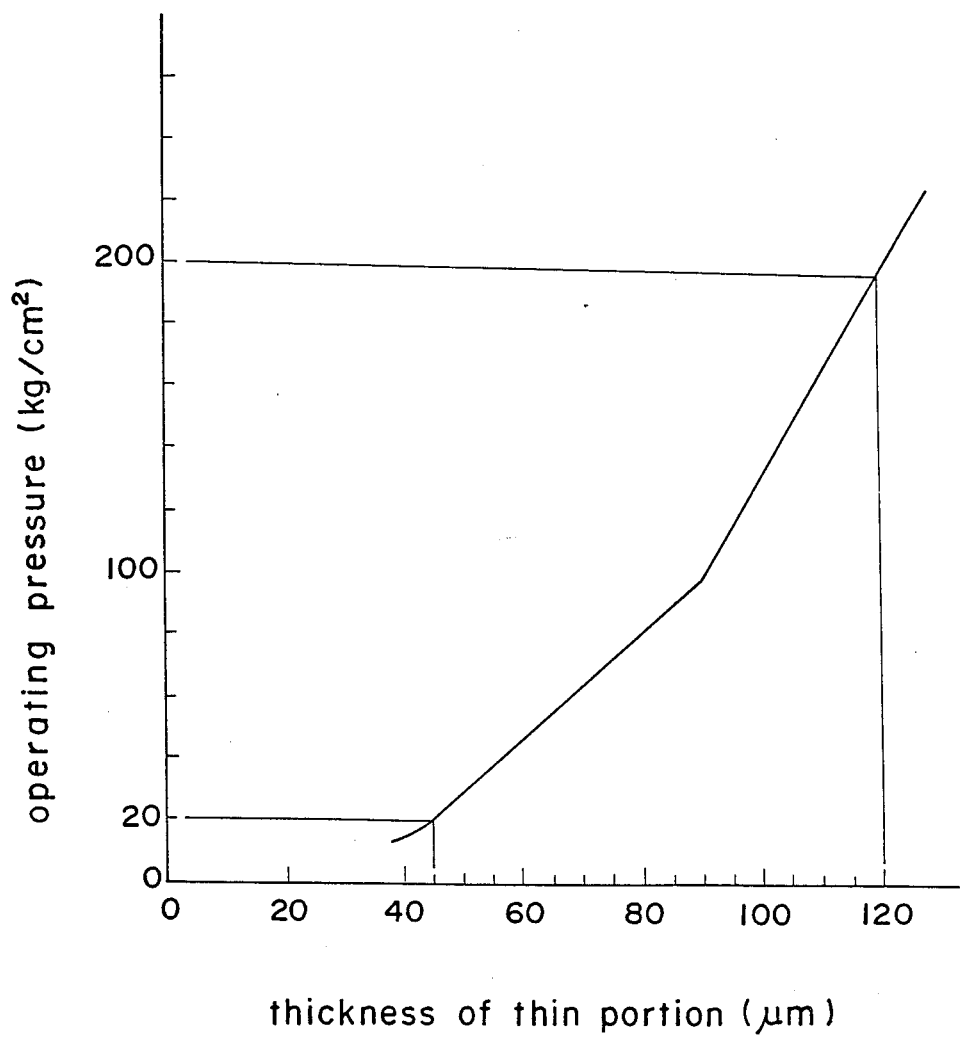
FIG. 12 is a graph showing a relationship between the thickness of the thin portion for preventing explosion provided in a container of a battery by forming a groove and the pressure for acting the function of preventing explosion.

As shown in Table 2, in case of forming the thin portion of 150 μm thick in the battery, the function for preventing explosion is not worked in all cases and the batteries are all ruptured with the containers teared in the side portions thereof. As estimable from the results of the working experiments of the function for preventing explosion shown in FIG. 12, it may be considered that, since the function for preventing explosion is worked in the pressure larger than 300 kg/cm², the thin portion provided in the bottom portion of the container is teared and burst so that the battery is ruptured before the function for preventing explosion is worked. In the battery having the thin portion for preventing explosion formed of 30 μm thick, the function for preventing explosion was worked at the temperature lower than 120° C. in case the volume of the air chamber was smaller than 900 μl. This is because, the thin portion for preventing explosion is so thin that the thin portion is teared and burst so as to work the function for preventing explosion under the condition of comparatively small internal pressure. Also in the battery having the volume of the air chamber of 400 μl, the function for preventing explosion was worked at the temperature lower than 120° C. This is because the internal pressure becomes very large at the temperature below 120° C. as shown in FIG. 10. On the other hand, in case the thickness of the thin portion for preventing explosion is in the range of 45 to 120 μm and the volume of the air chamber is in the range of 450 to 900 μl, in other words, the rate of the volume of the air chamber to the volume of the whole battery is in the range of 7.5 to 15% since the volume of the whole battery is 6 lm, the function for preventing explosion was worked at the temperature beyond 120° C. in every case. For example, in case the thickness of the thin portion is 45 μm and the volume of the air chamber is 450 μl, it may be considered that the working temperature of the function for preventing explosion is approximately 125° C. and the internal pressure of the air chamber is approximately 30 kg/cm². In case the thickness of the thin portion is 120 μm and the volume of the air chamber is 900 μl, it may be considered the working temperature of the function for preventing explosion is approximately 258° C. and the inner pressure of the air chamber is approximately 180 kg/cm² as shown in FIG. 10.

In this example, although the angle θ of forming the groove 3 is made 60 degrees and the width W of the thins portion 4 is made 0.15 mm, it is preferable that the angle θ of forming the groove 3 is generally made in the range of 50 to 80 degrees and that the width W of the thin potion 4 is generally made in the range of 0.09 to 0.5 mm wide.

As described above, according to the present invention, a groove having a flat bottom part thereof with a handstanding trapezoid shape in sectional view is formed in the bottom portion of the battery container, and the thickness of the thin portion for preventing explosion provided by forming the groove is made 45 to 120 μm and the rate of the volume of the air chamber in the battery to the volume of the whole battery is made 7.5 to 15%, whereby it is possible to provide a non-aqueous electrochemical cell comprising the function for preventing explosion which is not worked under the condition of usual use and is worked in safety.

EXAMPLE 3

Seven kinds of battery containers respectively having a different thin portion of 0.05 mm, 0.07 mm, 0.1 mm, 0.15 mm, 0.3 mm, 0.5 mm or 0.6 mm thick were made and seven kinds of single three type thionyl chloride lithium batteries were made by using said containers as shown in FIG. 8. The constitutional members of the battery is similar to those of the example 1.

The battery container 1 is made of stainless steel of 0.3 mm thick and the angle θ of forming the groove is made 60 degrees. Reference numeral 4 denotes a thin portion, which is formed in the shape of cruciform in the bottom portion 2 of the container 1 by forming the groove 3, and the thickness t of the thin portion 4 is made 0.07 mm, the width W thereof is varied to be 0.05 mm, 0.07 mm, 0.1 mm, 0.15 mm, 0.3 mm, 0.5 mm or 0.6 mm, and there are formed two cruciform shaped grooves 3 of 8 mm long, whereby the areas of the thin portions 4 are respectively 0.8 mm², 1.1 mm², 1.6 mm², 2.4 mm², 4.8 mm², 8 mm² and 9.6 mm². Since the areas of the bottom portions of the containers are 153.9 mm², the rates of the areas of these thin portions 4 to the areas of the bottom portions of the containers are respectively 0.5%, 0.7%, 1.0%, 1.6%, 3.1%, 5.2% and 6.2%.

The batteries mentioned above were put into fire and it was examined whether the batteries were ruptured with an explosive, and the results were shown in Table 3. In addition, the internal pressures were applied to the containers and the internal pressures of the containers were measured when the thin portions were teared and opened, and the results were also shown in Table 3.

As shown in Table 3, in case the width W of the thin portion 4 is below 0.30 mm and the rate of the area of the thin portion to the area of the bottom portion of the container is below 3.1%, the internal pressure for tearing the thin portion of the container is in the range of 62 to 80 kg/cm², therefore, it is considered that the function for preventing explosion is worked when the internal pressure of the container is in the range of 62 to 80 kg/cm², but when the battery was assembled and put into fire in actual, in case the rate of the area of the thin portion to the area of the bottom portion in the container was 0.5%, there occurred the ruptures in two samples among the ten samples of batteries, that is, the funtion for preventing explosion was not worked sufficiently. In case the rate of the area of the thin portion to the area of the bottom portion of the container was beyond 0.7%, the rupture of the battery in fire did not occur and a stable function for preventing explosion was worked. On the other hand, in case the rate of the area of the thin portion to the area of the bottom portion of the container becomes large, the pressure for tearing and opening the thin portion becomes high, and in case the rate of the area of the thin portion to the area of the bottom portion of the container is 5.2%, the pressure for tearing and opening the thin portion is 135 kg/cm², and there occurred no rupture of the battery in fire. In case the rate of the area of the thin portion to the area of the bottom portion of the container is 6.2%, the pressure for tearing and opening the thin portion is 280 kg/cm², and there occurred the ruptures in fire in six samples among ten samples.

Judging from the results mentioned above, it may be preferable that the rate of the area of the thin portion for preventing explosion to the area of the bottom portion of the container is in the range of 0.7 to 5.2%.

In this example, although the angle θ for forming the groove 3 is made 60 degrees and the thickness t of the thin portion 4 is made 0.07 mm, it is desirable that the angle θ for forming the groove 3 is generally made in the range of 50 to 80 degrees and that the thickness t of the thin portion 4 is generally made in the range of 0.04 to 0.12 mm.

As described above, according to the present invention, the rate of the area of the thin portion for preventing explosion formed in the bottom portion of the container to the area of the bottom portion of the container is made in the range of 0.7 to 5.2%, whereby the opened thin portion can be prevented from being closed when tearing and opening the thin portion, so that the stable function for preventing explosion can be worked.

EXAMPLE 4

The present invention is described in details on the basis of examples as follows.

There was formed a cruciform groove with handstanding trapezoid shape in sectional view on the bottom portion of the battery container cylindrical shaped with bottom portion of 47 mm high and of 14 mm diameter, which was made of stainless steel of 0.3 mm thick.

As shown in FIG. 6, the plan view of the groove mentioned above is a cruciform intersection which is made by crossing of two grooves 3 having the same length in the center portion of the bottom. The length B of the groove 3 is varied by changing the measure of a cruciform press mold, and the ratio B/A of the length of the groove 3 to the major diameter A of the container 1 made 0.25, 0.29, 0.43, 0.57, 0.71 and 0.86, moreover 0, i.e., a battery container having no groove is made.

As shown in FIG. 5, the sectional view of the groove 3 is handstanding trapezoid shaped (when the groove bottom part 3a is arranged in the bottom side of the container 1, wherein the angle θ for forming the groove 3 is made 60 degrees, the groove bottom part is made flat, the thickness t of the thin portion for preventing explosion formed in the bottom portion 2 of the container 1 by forming the groove 3, is made 0.07 mm, the width W thereof is made 0.15 mm.

Figure 13:
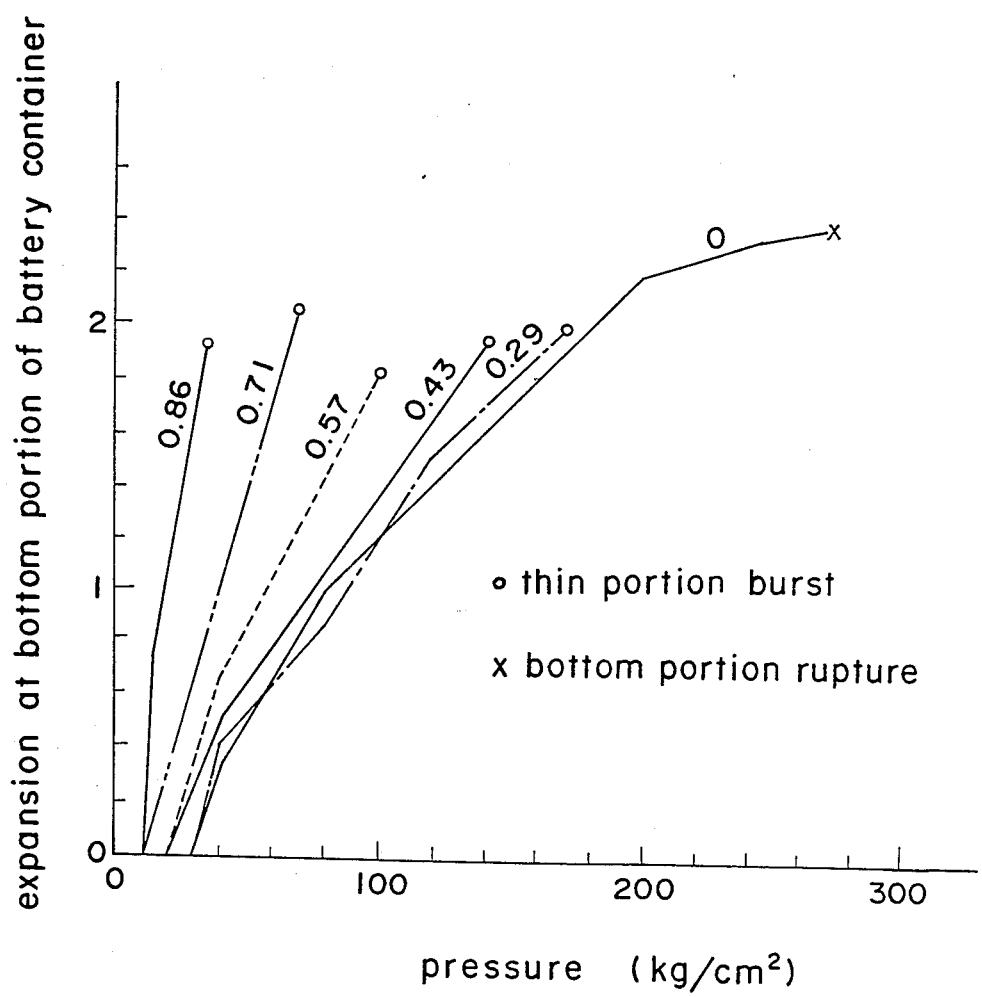
FIG. 13 is a graph showing a relationship between the pressure applied to the container of battery and the expansion at the bottom portion of the container of battery.

In case of applying water pressure to these battery containers, the relationship between the water pressure and the expansion of the bottom portion of the container is shown in FIG. 13.

In FIG. 13, the horizontal axis represents the pressure applied to the container and the vertical axis represents the expansion of the bottom portion of the container, wherein the relationships between the pressures and the expansions of the bottom portions of the containers are shown in case the ratios B/A of the lengths B to the major diameter A are 0 (i.e., having no groove), 0.29, 0.43, 0.57 and 0.86. Reference ° marks show that the thin portion formed in the bottom portion of the container by forming a groove is teared and opened, reference x marks show that the bottom portion of the container is ruptured. As shown in FIG. 13, in the same pressure, in case the ratio B/A of the length B of the groove to the major diameter A of the container is small, the expansion of the bottom portion of the container is small, the larger the ratio of the length of the groove to the major diameter of the container, the larger the expansion of the bottom portion of the container becomes in the same pressure, and when the expansion of the bottom portion is made 1.8 to 2.0 mm, the thin portion for preventing explosion is teared and opened. It may be considered that, in case the ratio B/A of the length B of the groove to the major diameter A of the container is large, the compressive strength of the bottom portion of the container is lowered so as to expand the bottom portion easily. In case of the container having no groove formed, the expansion of the bottom portion of the container is small when the pressure is applied to the container so that the bottom portion was ruptured with an explosive when the pressure was raised to 270 kg/cm$^2$.

Figure 14:
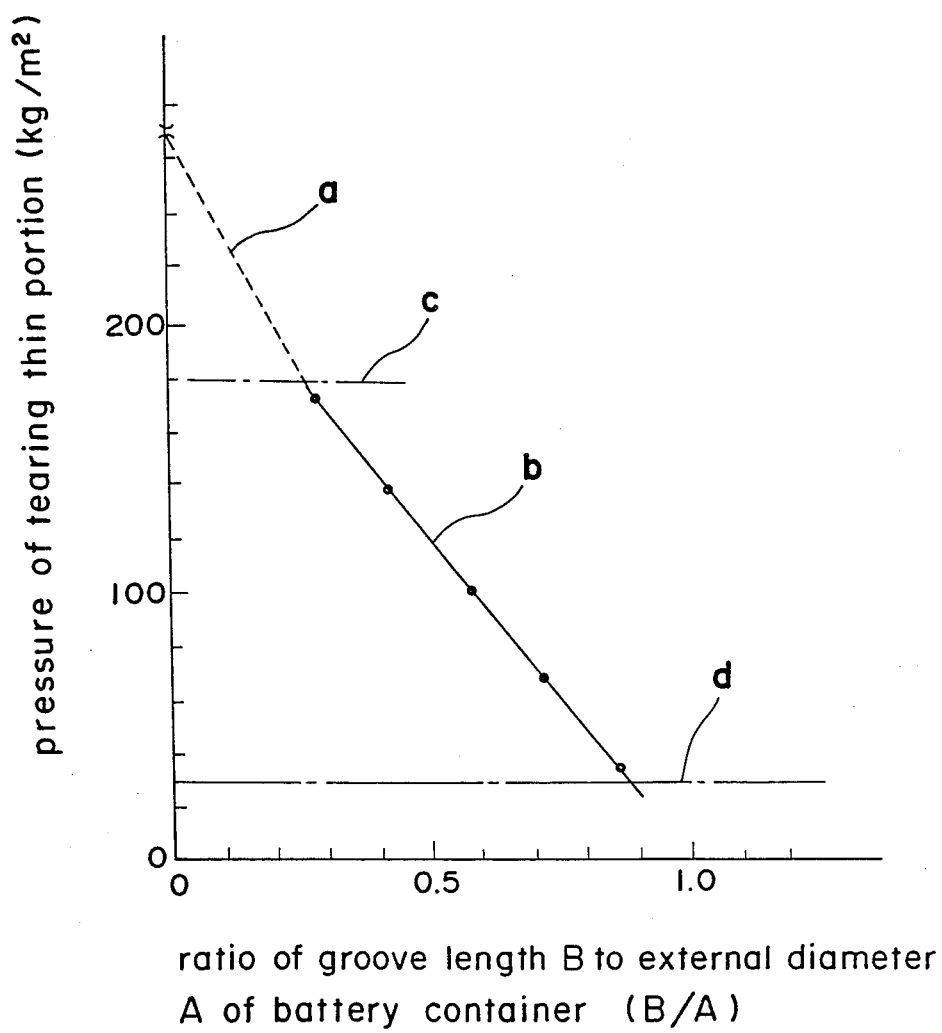
FIG. 14 is a graph showing a relationship between the ratio (B/A) of the length B of the groove to the external diameter A of the container of battery and the pressure of tearing and opening the thin portion of the container of battery.

FIG. 14 shows the relationship between the ratio B/A of the length B of the groove to the major diameter A of the container and the pressure for tearing and opening the thin portion for preventing explosion formed in the bottom portion of the container by forming the groove, wherein . marks represent the pressures for tearing and opening the thin portions for preventing explosion when the ratios B/A of the lengths B of the grooves to the major diameters A of the containers are 0.29, 0.43, 0.57, 0.71 and 0.86, and x mark represents the pressure when the bottom portion of the container having no groove formed is ruptured. A dotted line a is drawn between the two points, where the ratios B/A of the length B of the groove to the major diameter A of the container are 0 and 0.29, and a real line b is drawn between the two points where the ratios B/A are 0.29 and 0.86.

By the way, it becomes a problem in what range the pressure for working the function for preventing explosion should be set in the battery. Since the rupture of the bottom portion of the container occurs at the pressure of 270 kg/cm$^2$, it is desirable that the upper limit of the pressure for working the function for preventing explosion is made about 200 kg/cm$^2$, more desirable made about 180 kg/cm$^2$. Under the ordinary using condition, the internal pressure of the battery is raised up to about 5 kg/cm$^2$ at most and seldom raised up more than 10 kg/cm$^2$. Even though considering more or less diversities or corrosion during a long time storage, if the function for preventing explosion is set so as to be worked at the internal pressure of 20 kg/cm$^2$, desirably worked at the internal pressure of approximately 30 kg/cm$^2$, the function for preventing explosion is not worked while nothing is wrong with the battery.

From the viewpoint mentioned above, when the internal pressure for tearing and opening the thin portion for preventing explosion is set in the range of 30 to 180 kg/cm$^2$, the ratio B/A of the length B of the groove to the major diameter A of the container can be obtained as 25 to 88% from FIG. 14. In other words, the one dotted chain line c in FIG. 14 represents the pressure of 180 kg/cm$^2$ for tearing and opening the thin portion for preventing explosion, and from the point of intersection of the one dotted chain line c with the dotted line a, the ratio B/A of the length B of the groove to the major diameter A of the container is obtained as about 0.25 when the internal pressure for tearing and opening the thin portion for preventing explosion is 180 kg/cm$^2$. Moreover, the one dotted chain line d in FIG. 14 represents the internal pressure of 30 kg/cm$^2$ for tearing and opening the thin portion for preventing explosion, and from the point of intersection of the one dotted chain line d with the real line b, the ratio B/A of the length B of the groove to the major diameter A of the container is obtained as about 0.88 when the internal pressure for tearing and opening the thin portion for preventing explosion is 30 kg/cm$^2$.

FIG. 8 shows a thionyl chloride lithium battery of single three type assembled by using the battery container shown in FIGS. 5 and 6, wherein the component members of this battery are similar to those in Example 1.

The battery container 1 is made of stainless steel plate of 0.3 mm thick, and as shown in FIG. 6, the container 1 is cylindrical shaped with bottom portion (since FIG. 6 shows the container 1 in handstanding condition, the bottom portion 2 is shown in upper side), and there is formed a groove 3 of cruciform shaped in plan view in the center portion of the bottom portion 2 as shown in FIG. 6(a). As shown in FIG. 5, the groove 3 is handstanding trapezoid shaped with flat bottom part 3a in sectional view, wherein the angle θ for forming the groove is made 60 degrees, the thickness t of the thin portion 4 formed by forming the groove 3 is made 0.07 mm, the width W thereof is made 0.15 mm.

The length of the groove 3 is varied in various kinds and the ratio B/A of the length B of the groove to the major diameter A of the container is made 0.25, 0.29, 0.43, 0.57, 0.86, 0.93 and 0 (i.e., having no groove formed).

In these batteries, high temperature heating tests were done as follows and the results thereof were shown in Table 4. The high temperature heating tests were done in the process that the batteries were put into an electric muffle furnace and heated in a temperature up speed of 30° C./minute and then the working condition of the function for preventing explosion was examined.

Moreover, in order to examine the strength against the external compression force onto the battery, a load of 10 kg was applied to the center portion of the bottom portion of the container from the external portion of the battery by using a cylindrical rod having a tip diameter of 5 mm and it was examined whether or not the rupture of the thin portion of the container occurred, and the results thereof are also shown in Table 4.

Figure 4A:
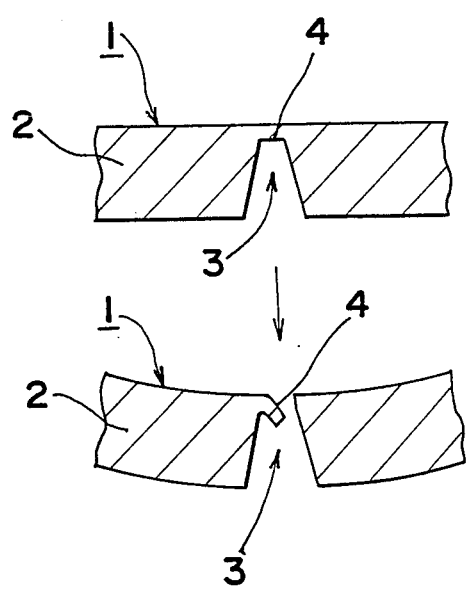
FIG. 4(a) shows a sectional view in case of a narrow thin portion and FIG. 4(b) shows a sectional view in case of a wide thin portion.
Figure 4B:
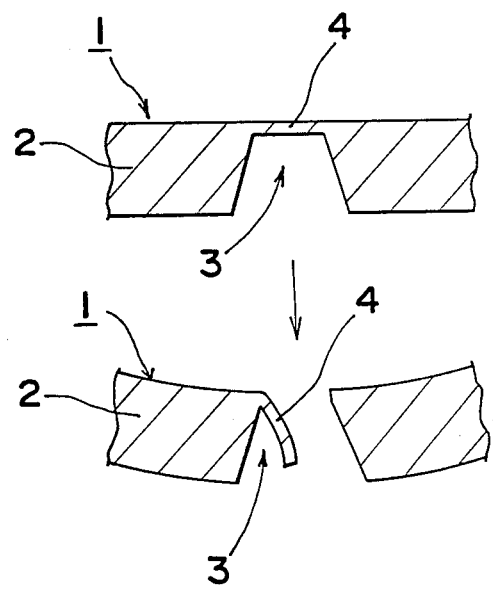
Figure 2:
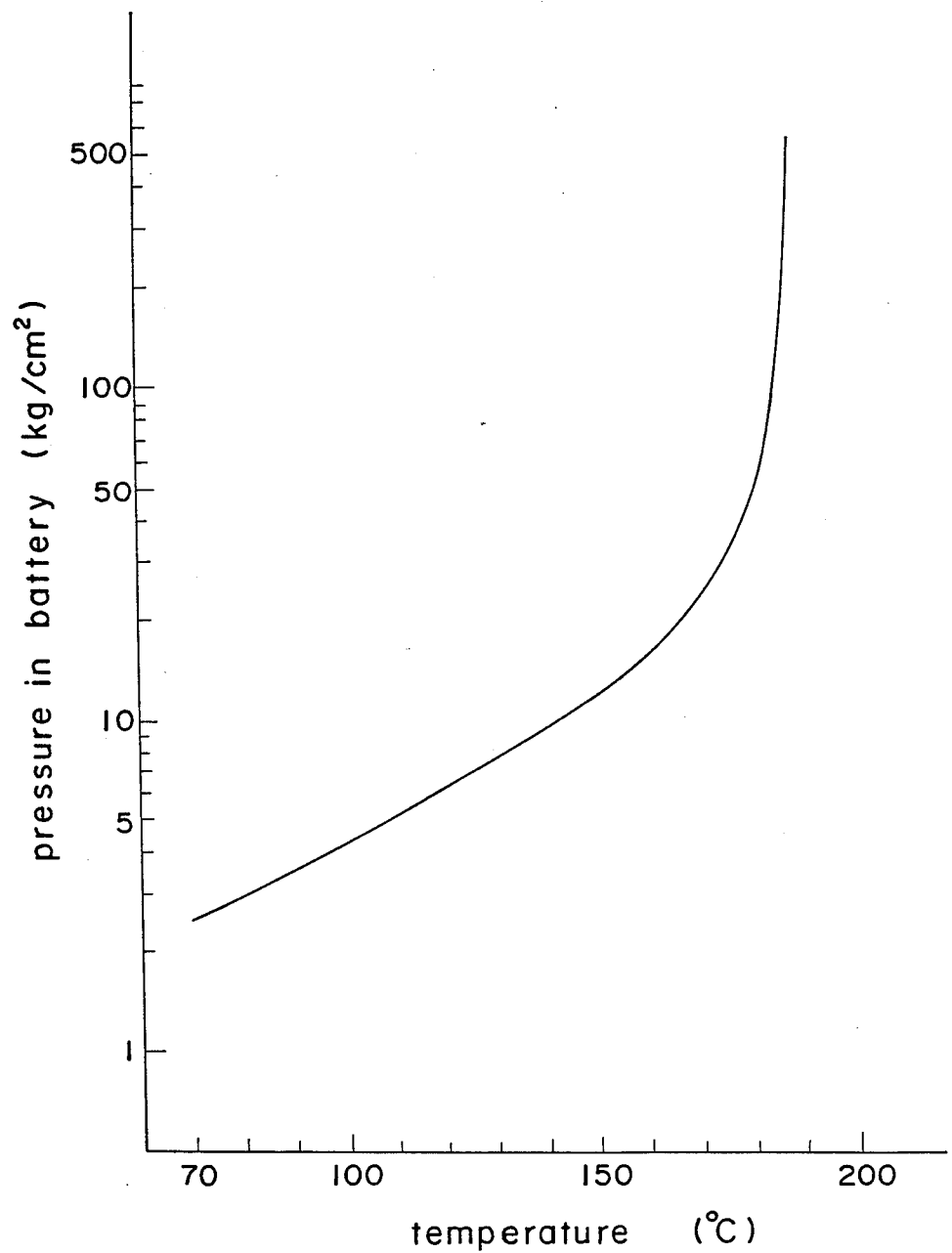
FIG. 2 is a graph showing a relationship between the internal pressure and the temperature in a thionyl chloride lithium battery.
Figure 3A:
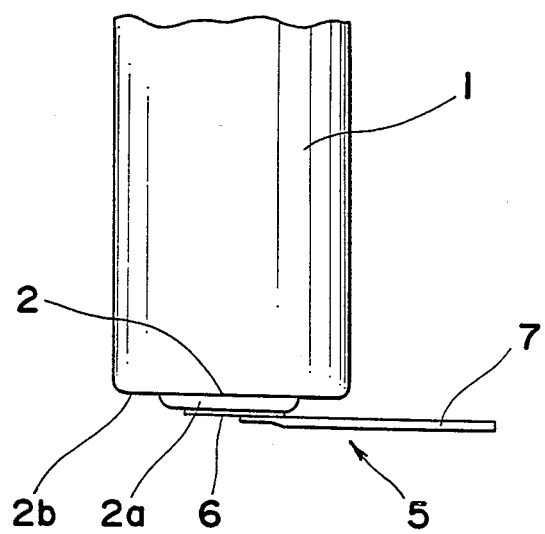
Figure 3B:
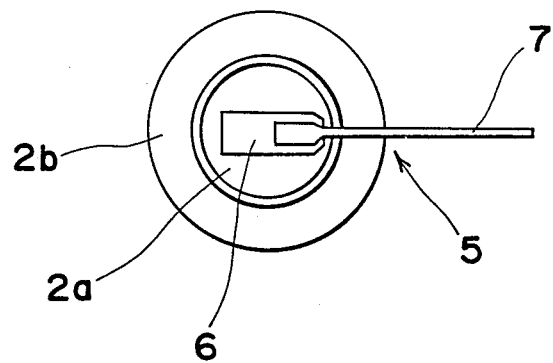

Ten batteries are sampled respectively and on the condition for working the function for preventing explosion in FIG. 4, the denominator represents the number of the samples and the numerator represents the number of the samples in which the function for preventing explosion was worked. Also in the column of the compression strength of the bottom portion of the container in Table 4, the denominator represents the number of the samples and the numerator represents the number of the samples in which the ruptures of the thin portions occurred.

As shown in Table 4, referring to the function for preventing explosion, in case the ratio B/A of the length B of the groove to the major diameter A of the container is 0, i.e., having no groove formed, the function for preventing explosion was not worked in all the samples and all of the containers were ruptured with an explosive at the temperature of 300° to 350° C. In case the ratio B/A is 0.25, in the seven batteries among the ten samples, the functions for preventing explosion were worked, but three functions for preventing explosion were not worked so that the containers were ruptured. This is because, since the length of the groove for providing the function for preventing explosion is so short that the compressive strength is too large, and even though the temperature of the battery is raised up to about 300° C. and the internal pressure becomes very high, the thin portion for preventing explosion is not teared and opened. When the ratio B/A of the length B of the groove to the major diameter A of the container becomes larger than 0.29, the functions for preventing explosion in all of the batteries were worked and the batteries were not ruptured. The working temperatures of the functions for preventing explosion were in the range of 170° to 230° C. when the ratio B/A was in the range of 0.29 to 0.71, but when the ratio B/A becomes large, the working temperature of the function for preventing explosion becomes lower and in case the ratio B/A was 0.93, there was a battery whose function for preventing explosion was worked at the temperature of 120° C. considering that the temperature of the battery may be about 120° C. in ordinary use, in case the ratio B/A of the length B of the groove to the major diameter A of the container is beyond 93%, the function for preventing explosion may be worked in ordinary use which is not an accident time.

On the other hand, according to the results of the test with respect to the compressive strength of the bottom portion of the container, when the ratio B/A of the length B of the groove to the major diameter A of the container becomes more than 0.86, the compressive strength against the external force becomes small and the bottom portion of the container was destroyed by pressing of external force onto the battery.

Judging from the results mentioned above, it may be desirable that the ratio B/A of the length B of the groove to the major diameter A of the container is set in the range of 0.29 to 0.71, i.e., the length of the groove is set in the range of 29 to 71% of the major diameter of the container.

In this example, though the angle θ for forming the groove 3 was made 60 degrees, the thickness t of the thin portion 4 was made 0.07 mm, the width W of the thin portion 4 was made 0.15 mm, it is preferable that the angle θ for forming the groove 3 is generally set in the range of 50 to 80 degrees, the thickness t of the thin portion is generally set in the range of 0.04 to 0.12 mm, the width W of the thin portion 4 is generally set in the range of 0.09 to 0.5 mm.

EXAMPLE 5

FIG. 15 is an enlarged sectional view showing a groove formed on the bottom portion of the container, the thin portion for preventing explosion and the neighborhood thereof according to the present invention, and FIG. 16 shows the handstanding container of the battery according to the present invention, FIG. 16(a) is a plan view thereof and FIG. 16(b) is a sectional view on the line X—X in FIG. 16(a). Since the container of the battery is shown in the handstand condition in FIGS. 15 and 16, the bottom portion of the container is shown in the upper portion and FIG. 16(a) is a plan view seen from the bottom side of the container.

Figure 17:
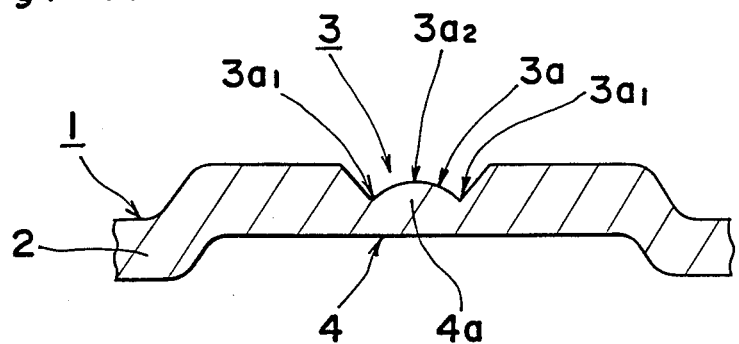
FIG. 17 is a partial enlarged sectional view along the line Y—Y in FIG. 16(a)
Figure 18:
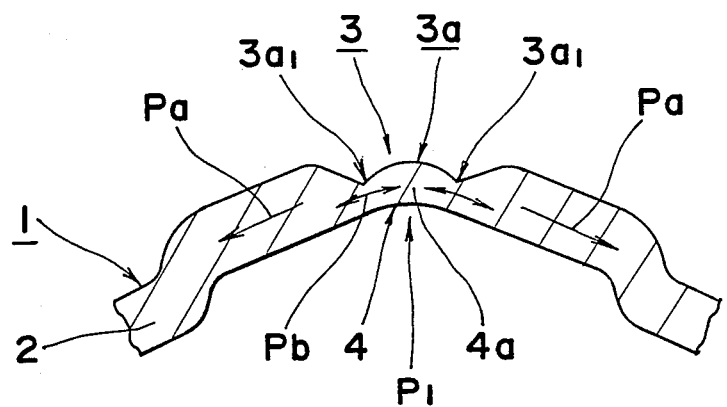
FIG. 18 is a partial enlarged sectional view showing the bottom portion of the container of battery shown in FIG. 17 when an internal pressure is applied to the bottom portion inside the container of battery.

The container 1 is cylindrical shaped with bottom portion before assembling the battery as shown in FIG. 16 (since FIG. 16 shows the container in the handstand condition, the bottom portion 2 is shown in the upper portion in FIG. 16(b)), wherein the groove 3 of cruciform shaped in plan view is formed on the convex portion 2a in the center portion of the bottom portion 2 as shown in FIG. 16(a). The groove 3 is handstanding trapezoid shaped having a flat bottom part 3a in sectional view as shown in FIG. 5 (said handstanding trapezoid shape means the shape when the groove bottom part 3a is arranged in the lower side), and the most part of the thin portion for preventing explosion formed in the bottom portion 2 of the container 1 by forming the groove 3, in other words, the thin portion 4b of the thin portion 4 except the intersection 3b of the grooves 3 is made flat. As shown in FIG. 15, the central portion 4a of the thin portion 4 corresponding to the intersection 3b of the grooves 3 is made convex and the ratio of the thickness $t_1$ of the central portion 4a to the thickness $t_2$ of the thin flat portion 4b corresponding to the portion except the intersection 3b of the grooves 3 is set in the range of 1.05 to 1.5. FIG. 17 is a sectional view showing the bottom portion 2 of the container 1 on the line Y—Y, i.e., the line diagonally across the intersection 3b of the grooves 3, wherein the sectional view of the groove 3 is generally W character shaped and the central spot $3a_2$ of the groove bottom part 3a is slightly higher than the both edge portions $3a_1$, $3a_1$.

When the internal pressure of the battery is raised up after assembling the battery, the edge portions $3a_1$ of the groove bottom part 3a undergo a tensile force Pa caused by the internal pressure Pl and a tensile force Pb caused by the bend of the thin portion mixedly caused by the internal pressure Pl of the battery so that the edge portions $3a_1$ of the groove bottom part 3a are teared and opened. Since the central portion 4a of the thin portion 4 situated at the intersection 3b of the grooves 3 is made thicker than the other thinned flat portion 4b, the sectional view of the groove 3 is W character shaped as shown in FIG. 17, and when the internal pressure of the battery is raised up, the tensile force Pa caused by the internal force and the tensile force Pb caused by bending are concentrated keenly onto the edge portions $3a_1$ of the groove bottom part 3a so as to tear the edge portions $3a_1$, therefore, the edge portions $3a_1$ of the groove bottom part 3a are teared and opened in the lower internal pressure than in the case that the thickness of the central portion 4a of the thin portion 4 corresponding to the intersection 3b of the grooves 3 is made in the same thickness of the other thinned flat portion 4b.

Next Table 5 shows the results of the tests for working the function for preventing explosion by adopting air pressure into the container of the battery. The container 1 is made of stainless steel of 0.3 mm thick. As shown in FIG. 5, the groove 3 is handstanding shaped in sectional view, wherein the angle $\theta$ for forming the groove is made 60 degrees and the width W of the bottom part 3a of the groove 3 is made 0.15 mm. The thinned portion 4 is formed in the bottom portion 2 of the container 1 having the groove 3 formed thereon, wherein thickness $t_2$ of the thinned flat portion 4b corresponding to the thinned portion 4 except the intersection 3b of the grooves 3 is made 80 $\mu$m. As shown in FIG. 15, the thickness $t_1$ of the convex portion 4a corresponding to the intersection 3b of the grooves 3 is made 1.05 (Sample No. 1), 1.30 (Sample No. 2), 1.50 (Sample No. 3) times thicker than the thickness $t_2$ of the thinned flat portion 4b in the thinned portion 4 corresponding to the portion except the intersection 3b of the grooves 3.

For comparison, also with respect to the container of the battery (Sample No. 4) having a cruciform groove with roundness at the bottom of the groove such as a conventional alkaline battery, the test for working the function for preventing explosion was examined. The sectional view of the groove of the container of the sample No. 4 is shown in FIG. 1, wherein the angle $\theta$ for forming the groove 3 is made 90 degrees and the tip portion of the bottom of the groove 3 is made round and the thickness $t_4$ of the flat thinned portion 4 is made 80 $\mu$m.

Figure 19:
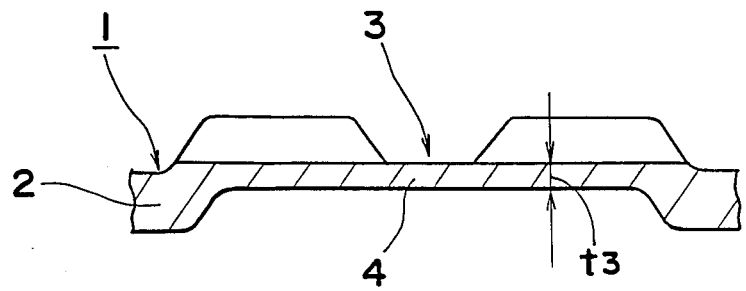
FIG. 19 is an enlarged sectional view showing a bottom portion having a groove of a handstand trapezoid shape in sectional view on the thin portion formed generally evenly on the whole part of the bottom portion.

Also for comparison, with respect to the container of the battery (Sample No. 5) having a groove of handstanding trapezoid shaped in sectional view and cruciform shaped in plan view formed, whose thinned portion is generally made flat, the test for working the function for preventing explosion was examined. The shape of the groove and the neighborhood thereof of the container of the sample No. 5 is shown in FIG. 19, wherein the angle $\theta$ for forming the groove 3 is made 60 degrees, the width W of the bottom part of the groove 3 is made 0.15 mm and the thickness $t_3$ of the thinned portion 4 corresponding to the intersection of the grooves 3 and to the portion except the intersection of the grooves 3 is made 80 $\mu$m.

As shown in Table 5, in the containers of the batteries of Samples No. 1 to No. 3 and No. 5 having a groove of handstanding trapezoid shaped in sectional view, though in flat thinned portion, the operating pressure of the function for preventing explosion was lower than that in the containers of the battery of the sample No. 4 having a groove of V character shaped in sectional view with round tip portion such as an alkaline battery. In the containers of the batteries of the samples No. 1 to No. 3 in which the thickness of the intersection of the grooves in the thinned portion is larger than the thickness of the thinned portion except the intersection, the operating pressure of the function for preventing explosion was lower than that in the container of the battery of the sample No. 5 in which the thickness of the thinned portion is generally made flat, i.e., the intersection of the grooves is as thick as the other thinned portion except the intersection. Judging from the results mentioned above, according to the present invention, the thinned portion corresponding to the intersection of the grooves is made more thicker than the other thinned portion except the intersection of the grooves, whereby even though the thinned portion is made thick, the explosion-proof arrangement can be operated in a lower pressure than in case of the container of the conventional battery, in other words, it may be found that the explosion-proof arrangement can be operated in a range of the pressure in which the safety of the container of the battery can be more ensured.

Table 6 shows the results whether or not the batteries mentioned above are ruptured with a big explosive after putting the batteries in to fire. Similarly to the examples 1, 2 and 3, three sorts of batteries are made and each of the batteries of examples 1 to 3 is made by using the container of each of the samples No. 1 to No. 3. Moreover, for comparison, not only the battery made as mentioned above (comparative example 1) but also the battery adopting the container of Sample 4 having a groove of V character shaped in sectional view with round tip portion thereof are put into fire and it is examined whether or not the batteries are ruptured with an explosive and the results are also shown in Table 6. In every example, the number of the samples is ten, and the denominators of the values in the column of 'Number of batteries ruptured in fire' in Table 6 represent the number of the sampling batteries and the numerators represent the number of the batteries ruptured in fire.

As shown in Table 6, in every case of the batteries of Examples 1 to 3 according to the present invention, there occurred no rupture in fire at all so that the stable explosion-proof arrangement was operated.

Although in this example the angle $\theta$ for forming the groove 3 was made 60 degrees and the width W of the groove bottom part 3a is made 0.15 mm, it is preferable that the angle θ for forming the groove 3 generally made in the range of 50 to 80 degrees and that the width W of the groove bottom part 3a is generally made in the range of 0.09 to 0.5 mm. Although the thickness of the thinned portion 4 except the intersection of the grooves was made 80 μm, it is preferable that the thickness of the thinned portion 4 except the intersection of the grooves is generally made in the range of 30 to 100 μm. Especially in the present invention, the thinned portion corresponding to the intersection of the grooves is formed thicker than the other thinned portion except the intersection so that the operating pressure of the explosion-proof arrangement can be lowered, therefore, even though the thickness of the thinned portion except the intersection of the grooves is made in the range of 70 to 100 μm, the explosion-proof arrangement can be operated in the range of the pressure ensuring the safety of the container of the battery.

EXAMPLE 6

In this example the container 1 is made of stainless steel plate of 0.3 mm thick (SUS 304 plate) by making the stainless steel plate into can shaped (can shape means cylindrical shape with bottom portion) by means of transfer press, subsequently annealing the stainless steel plate.

The container of the battery was maintained at the temperature of 950° C. for 15 minutes in a vacuum furnace, furthermore after maintaining the container at the temperature of 1010° C. for 10 minutes, the container was gradually cooled for 60 minutes in nitrogen gas, whereby the annealing process was performed.

A punch having a convex portion of handstanding trapezoid shaped in sectional view with a flat tip portion for forming a groove was used and the center portion of the bottom portion 2 of the container 1 was pressed in cruciform shape by the punch, whereby the groove was formed.

Next, the container was annealed in order to lower the hardness raised up due to the work hardening when forming the groove. This annealing process as well as the aforementioned annealing process after the can production was performed in the process that the container 1 was maintained at the temperature of 950° C. for 15 minutes in the vacuum furnace, furthermore after maintaining it at the temperature of 1010° C. for 10 minutes, the container 1 was gradually cooled in nitrogen gas for 60 minutes.

Figure 20:
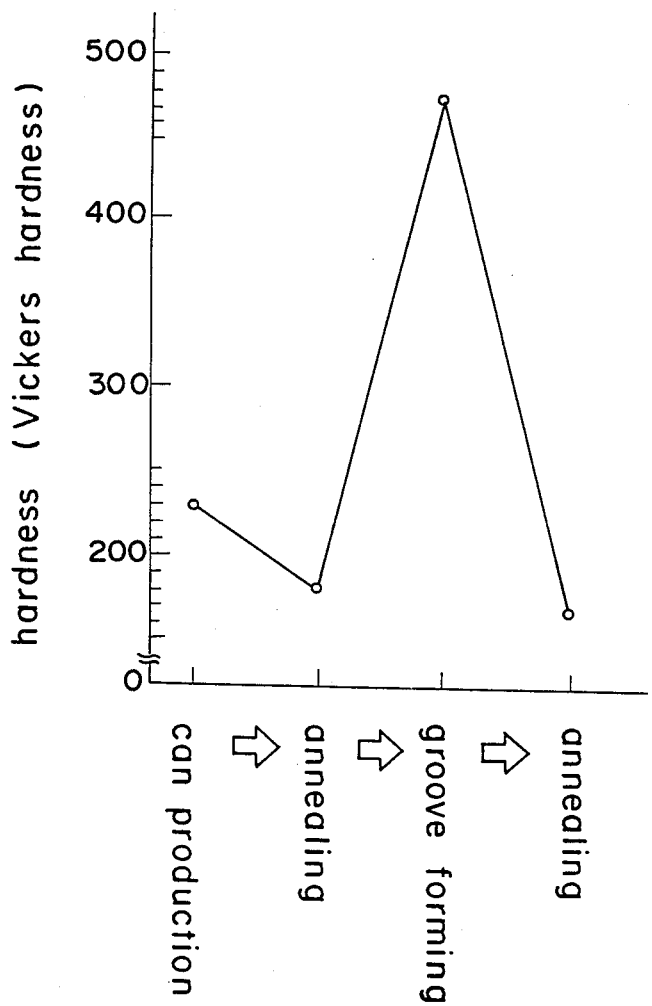
FIG. 20 is a graph showing a changing of the hardness of the same part in the bottom portion of the container of battery at each process of can production, annealing, groove forming and annealing.

The changing of the hardness at the same portion (the thinned portion formed after forming the groove) in the bottom portion of the container in the process of the can production → annealing → groove forming → annealing is shown in FIG. 20.

The hardness of the thinned portion of the container was measured by using a micro Vickers hardness meter under the condition of the load of 200 g and of the maintaining time of 10 minutes. Moreover, the Vickers hardness of the stainless steel plate (SUS 304 plate) before the can production was 150.

As shown in FIG. 20, the hardness (Vickers hardness) was once raised up to about 230 due to the can production, next lowered to about 180, and raised up to about 480 due to the work hardening when forming the groove, and lowered to about 170 by annealing.

Table 7 shows the results of the pressure for tearing the thinned portion for preventing explosion, i.e., the operating pressure of the explosion-proof arrangement by adopting water pressure into the container (Sample No. 1) which was annealed after forming the groove and into the container (Sample No. 2) which was not annealed after forming the groove. The angle θ for forming the groove 3 is made 60 degrees, the width W of the thinned portion 4 is made 0.15 mm and the thickness t of the thinned portion 4 is made 80 μm. The number of the sampling batteries in each example is 100 respectively, and both of the hardness and the operating pressure of the explosion-proof arrangement are shown by the average values and the dispersions (in the range from minimum to maximum).

100 pieces of the batteries formed as described above are put into fire and the results whether or not the batteries are ruptured with a big explosive are shown in Table 8. Each of the batteries comprises the container of the battery of Sample No. 1 which was annealed after forming the groove. Moreover for comparison, 100 pieces of batteries (Comparative Sample 1) were put into fire and it was examined whether or not the batteries were ruptured with a big explosive, wherein the batteries (Comparative Sample 1) were made in the similar way mentioned above except employing the container of battery of Sample No. 2 which was not annealed after forming the groove, also showing the results in Table 8. Furthermore, the battery (Comparative Sample 2) was made in the similar way mentioned above except employing the container of the battery (Sample No. 3) such as an alkaline battery having a round tip portion and a groove of V character shaped in sectional view formed, and 100 pieces of the batteries (Comparative Sample 2) were also put into fire and it was examined whether or not the batteries were ruptured with a big explosive, also showing the results in Table 8. The shape of the groove formed in the container (Sample No. 3) of the battery (Comparative Sample 2) is shown in FIG. 1, wherein the angle θ for forming the groove is made 90 degrees and the tip portion of the groove is made round with 0.1 mmR and the thickness t of the thinned portion 4 is made 80 μm. In every example the number of the sample of the containers of the batteries is 100 respectively, and the denominators of the values in the column of 'Number of batteries ruptured in fire' in Table 8 represent the number of the sampling batteries and the numerators thereof represent the number of the batteries ruptured in fire.

As shown in Table 8, in the batteries of the present invention employing the container of the battery of Sample No. 1 which was annealed after forming the groove, there occurred no rupture in fire of the containers at all, that is, the stable explosion-proof arrangement was operated. On the contrary, in the batteries of Comparative sample 1 employing the container of the battery of Sample No. 2 which was not annealed after forming the groove, since the operating pressure of the explosion-proof arrangement was raised up due to the work hardening when forming the groove and the dispersion was large, 93 samples among the 100 batteries were ruptured in fire. In the batteries of Comparative Sample 2 employing the container of the battery of Sample No. 3 such as an alkaline battery having a groove for preventing explosion with a round tip portion and with generally V character shape in sectional view formed, 75 samples among the 100 sampling batteries were ruptured in fire.

Although the angle θ for forming the groove 3 is made 60 degrees and the width W of the bottom part 3a thereof is made 0.15 mm, it is preferable that the angle θ for forming the groove 3 is generally made in the range of 50 to 80 degrees and the width W of the bottom part 3a thereof is generally made in the range of 0.09 to 0.5 mm.

EXAMPLE 7

Figure 21A:
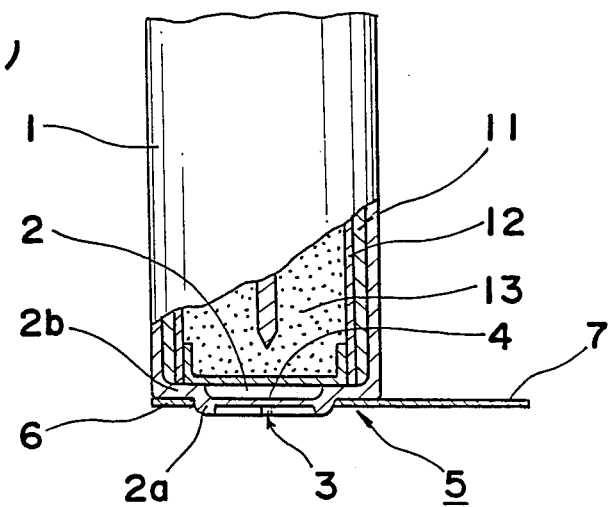
FIG. 21(a) is a partial sectional view showing an essential part thereof and FIG. 21(b) is a bottom plan view thereof.
Figure 21B:
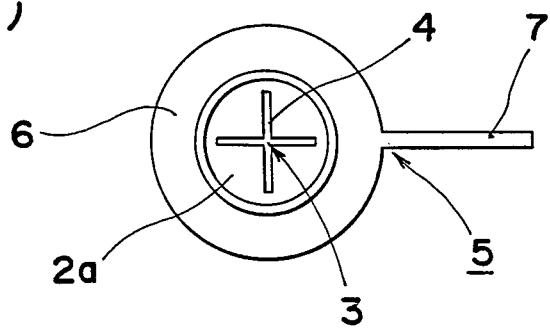

FIG. 21 shows an example of an explosion preventing sealed type battery with a lead terminal according to the present invention, wherein FIG. 21(a) is a partial sectional view showing an essential part thereof and FIG. 21(b) is bottom plan view thereof.

In FIG. 21, reference numeral 1 denotes a container of battery which is made of stainless steel, wherein a convex portion 2a is provided in the center portion of the bottom portion 2 of the container 1 and a cruciform groove 3 is formed on the convex portion 2a so that a cruciform shaped thinned portion 4 for preventing explosion is formed in the bottom portion 2 of the container 1. Reference numeral 5 denotes a lead terminal which is made of stainless steel and comprises of a ring shaped collector portion 6 and a slender thin plate lead portion 7 and is attached to the container 1 by spot-welding the ring shaped collector portion 6 with the circumference 2b of the bottom portion 2 of the container 1. The major diameter of the container 1 is made 14 mm, the major diameter of the root portion of the convex portion 2a in the center portion of the bottom portion 2 is made 8.5 mm and the internal radius of the ring shaped collector portion 6 of the lead terminal 5 is made 8.8 mm. Although the internal radius of the ring shaped collector 6 of the lead terminal 5 is slightly different from the major diameter of the convex portion 2a in the center portion of the bottom portion 2 of the container 1, both of them are shown in the same size in FIG. 21(b) for simplification. The thickness of the lead terminal 5, of the collector portion 6 and of the lead portion 7 are all made 0.2 mm.

Although the thinned portion 4 for preventing explosion is formed on the convex portion 2a in the center portion of the bottom portion 2 of the container 1, according to the present invention since the collector portion 6 of the lead terminal 5 is made ring shaped or partially cut-off ring shaped and is welded to the circumference 2b of the bottom portion 2 of the container 1 where the thinned portion 4 for preventing explosion is not formed, it can be prevented that the thinned portion 4 for preventing explosion is damaged when mounting the lead terminal 5 or the collector portion 6 of the lead terminal 5 lowers the function for preventing explosion of the thinned portion 4. In this example, though the groove 3, i.e., the thinned portion 4 is formed on the convex portion 2a because the convex portion 2a is formed in the center portion of the bottom portion 2 of the container 1, the convex portion 2a works as a guide when mounting the lead terminal 5 in order to fix the attaching portion of the lead terminal 5, that is, the convex portion 2a is not always necessary for the function of the battery and the bottom portion 2 of the container 1 may be formed flat. In this case, the groove 3 and the thinned portion 4 may be formed in the central portion of the flat botom portion 2 of the container 1, whereby the function for preventing explosion cannot be lowered compared with the case of forming the groove 3 and the thinned portion 4 on the convex portion 2a.

Figure 22A:
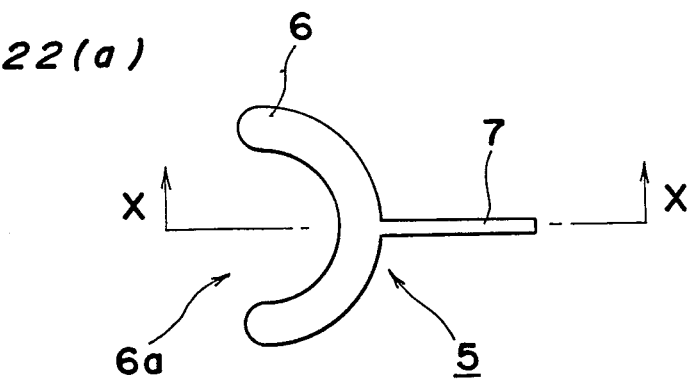
FIG. 22(a) is a plan view thereof and FIG. 22(b) is a sectional view along the line X—X in FIG. 22(a)
Figure 22B:
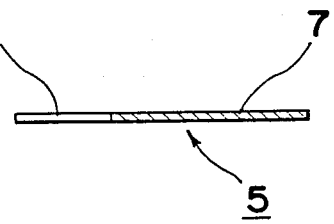

FIG. 22 shows another example of a lead terminal, wherein the collector portion 6 of the lead terminal 5 is formed in the shape of partially cut-off ring. The cut-off portion 6a may be formed smaller or larger than that shown in FIG. 22(a) and in case of a larger cut-off portion 6a, it is preferable from the viewpoint of attaching the lead terminal stably that the cut-off portion 6a is formed smaller than a semicircular size. Also in case of the lead terminal 5 having a partially cut-off ring shaped collector portion 6, the partially cut-off ring shaped collector portion 6 is welded to the circumference 2b of the bottom portion 2 of the container 1 having the thinned portion 4 for preventing explosion formed in the center portion of the bottom portion 2, whereby the lead terminal 5 having a partially cut-off ring shaped collector 6 can be attached to the container of the battery without affecting the thinned portion 4 for preventing explosion as well as the lead terminal 5 with the ring shaped collector portion 6.

EXAMPLE 8

Figure 23:
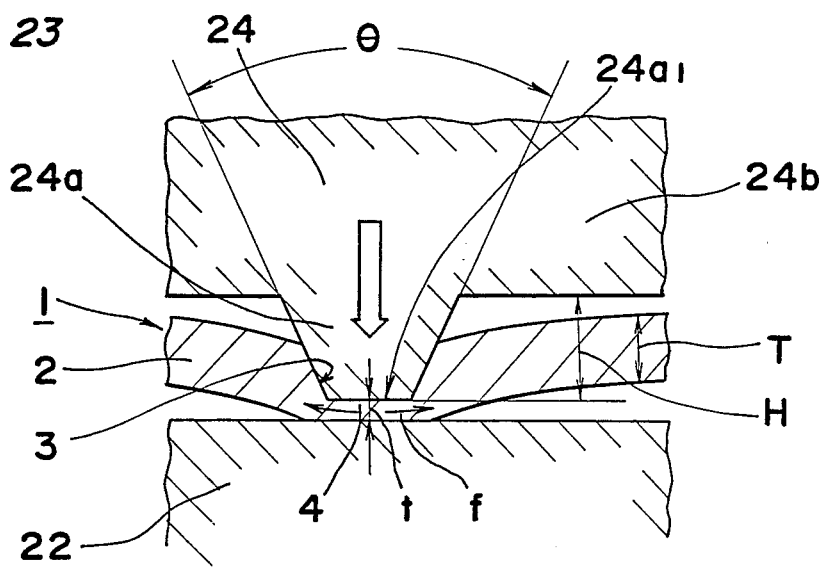
FIG. 23 is a partial enlarged sectional view showing a bottom portion of a container of battery having a projection of a punch for forming a groove pressed into the bottom portion.
Figure 24:
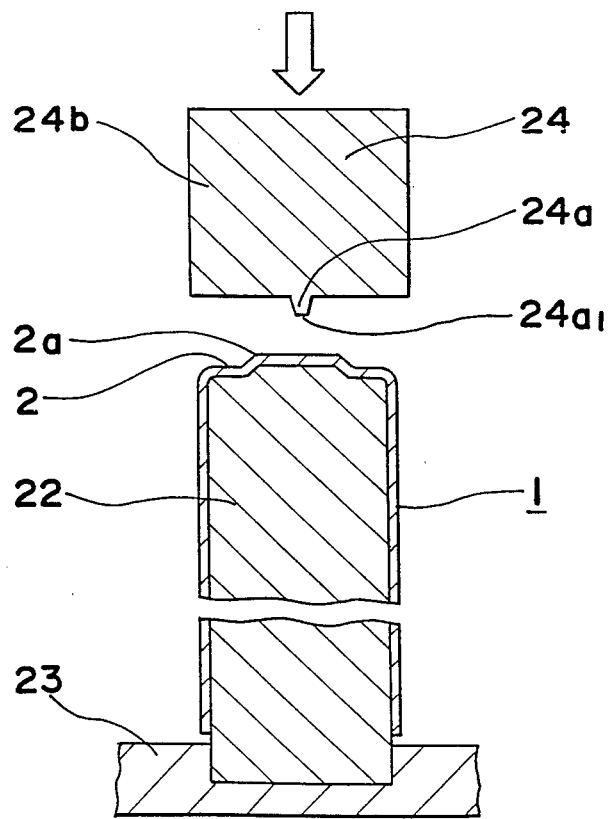
FIG. 24 is a sectional view showing the whole part of the container of battery before the punch for forming a groove is fallen down on the bottom portion.

FIGS. 23 and 24 show the condition when the groove is formed on the container of the battery in the way of the present invention, FIG. 23 is a partial enlarged sectional view showing the condition when a punch for forming a groove is fallen down and the convex tip portion of the punch for forming a groove is pressed into the bottom portion of the container, and FIG. 24 is a sectional view showing the whole part of the container before the punch is fallen down onto the bottom portion of the container.

Referring to FIG. 24, reference numeral 1 denotes a container of a battery, numeral 24 denotes a punch for forming a groove, numeral 24a denotes a convex portion of the punch for forming a groove, numeral 24b denotes a substrate portion of the punch. The container 1 is made cylindrical shaped having a bottom portion and it is shown under the handstand condition thereof disposed on a female mold 22. Reference numeral 23 denotes a pedestal. The punch 21, as shown in FIG. 24, is fallen down and the convex portion 21a of the punch 21 for forming a groove is pressed into the bottom portion 2 of the container 1 as shown in FIG. 23, whereby the groove 3 is formed on the portion 2 of the container 1. The tip portion $21a_1$ of the convex portion 21a of the punch 21 for forming a groove is made flat so that the bottom part of the groove 3 formed by the convex portion 21a of the punch 21 is made flat. The angle $\theta$ for forming a groove of the convex portion 21a of the punch 21 is made in the range of 50 to 80 degrees, therefore, there occurs a tensile force f in the member of the bottom part pressed by the tip portion $21a_1$ of the convex portion 21a of the punch 21 for forming a groove as shown in FIG. 23, and since the portion where the groove is not formed is not applied by a binding force, i.e., under non-binding condition, the portion, where the groove is not formed, of the bottom portion 2 of the container 1 becomes deformable so that the deformation resistance force of said portion having no groove formed and the frictional force between the convex portion 21a of the punch for forming a groove and the portion having no groove formed of the container 1 become small.

In this example, as shown in FIG. 6(a), since the groove 3 is formed with a cruciform shape in plan view, the convex portion 21a of the punch 21 for forming a groove is made cruciform shaped, however, FIGS. 23 and 24 show the aspect having a groove of one line shaped formed for simplification.

In this example, the container 1 is made of stainless steel plate of 0.3 mm thick, the angle $\theta$ of the convex portion 21a of the punch for forming a groove is made 70 degrees, the tip portion $21a_1$ of the convex portion $21a$ for forming a groove is made flat and the width thereof is made 0.15 mm, the depth of the groove 3 is made 0.23 mm, the thickness of the thinned portion 4 provided by forming the groove 3 is made 0.07 mm, and the width of the flat portion $3a_1$ in the groove bottom part $3a$ (see FIG. 8) is made 0.15 mm. Even though the bottom portion of the container is pressed by the punch for forming a groove by using general lubricating oil such as machine oil, the load applied to the tip portion of the convex portion $24a$ of the punch for forming a groove can be suppressed below 240 kg/mm$^2$ so that it becomes possible to form a groove with high productivity. The height of the convex portion $21a$ of the punch for forming a groove is made 0.7 mm, and though the part of the bottom portion of the container where the groove is not formed is slightly projected, there is a space of 0.07 mm thick between the top surface of said part having no groove formed and the substrate portion $24b$ of the punch 24 so that the press molding becomes possible under non-binding condition. The sectional view of the formed groove 3 is made handstanding trapezoid shaped as shown in FIG. 5.

The punch had an endurance of more than 200 thousands times of pressing when the groove was formed by the press mold under the non-binding condition, however, the punch had an endurance of less than 50 thousands times of pressing when the groove was formed by the press mold under the binding condition, i.e., the condition of the height of the convex portion of the punch for forming a groove set in the same length as the depth of the groove to be formed.

In order to form the groove stably under the non-binding condition, as shown in FIG. 23, assuming that the height of the convex portion $21a$ of the punch 24 for forming a groove is H and the thickness of the container 1 is T and the thickness of the thin portion 4 is t, it is preferable that the height H of the convex portion $21a$ of the punch for forming a groove is set as follows;

$$H \geq 1.5(T-t)$$

This is because, since the neighborhood of the groove forming portion of the container is deformed and slightly projected at the time of forming the groove, it is preferable that the height H of the convex portion $21a$ of the punch for forming a groove is made larger than the depth of the groove to be formed as as to apply the binding force caused by the substrate portion of the punch to the portion having no groove formed of the bottom portion of the container and to stabilize and suppress the load applied to the convex portion $21a$ of the punch for forming a groove.

The thionyl chloride lithium batteries having a groove for preventing explosion formed in the bottom portion of the container as described above, were put in fire and it was examined whether or not the batteries were ruptured with a loud explosive, showing the results thereof in Table 9. For comparison, also the batteries comprising the container having a grove with a round bottom part (the angle $\theta$ for forming a groove is 90 degrees, the roundness of the groove bottom part is 0.2 mm R, the thickness of the thin portion is 0.07 mm) formed, such as alkaline batteries, were examined whether or not they were ruptured in fire, also showing the results in Table 9 for comparison. In Table 9, the denominators in the column of 'Number of batteries ruptured in fire' show the number of the sampling batteries, the numerators show the numbers of the batteries ruptured in fire (i.e. the batteries functions for preventing explosion are not worked and which are ruptured with a loud explosive in a high pressure). Since every groove in formed by the press molding, after forming the groove, the container of the battery is annealed at the temperature of 1010° C. for ten minutes in order to reduce the work hardening due to forming of the groove.

As shown in Table 9, in the batteries made by employing the container having the groove formed according to the present invention, there occurred no rupture in fire at all, in other words, the function for preventing explosion was effectively worked.

As described above, according to the present invention, under the non-binding condition, the groove with the angle for forming the groove made 50 to 60 degrees is formed on the bottom portion of the container by press molding and a tensile force is applied to the member of the bottom part of the groove so that the deformation resistance force of the molded member of the bottom portion and the frictional force between the punch for forming a groove and the molded member of the bottom portion are reduced, whereby the mass production of the groove with a flat bottom part is made possible by the press molding with the durable punch having the endurance of more than 20 thousands times of press molding.

Figure 25:
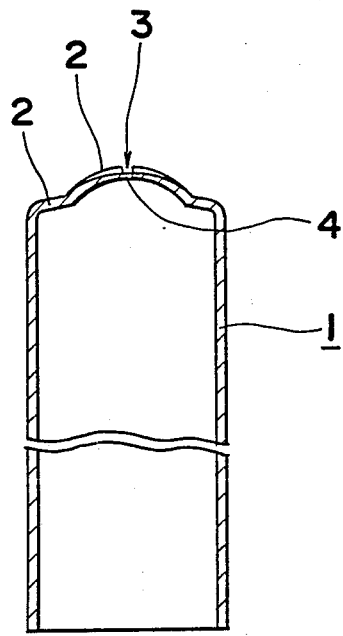
FIG. 25 is a sectional view showing the container of battery when a groove is formed in the way shown in FIGS. 23 and 24.
Figure 26:
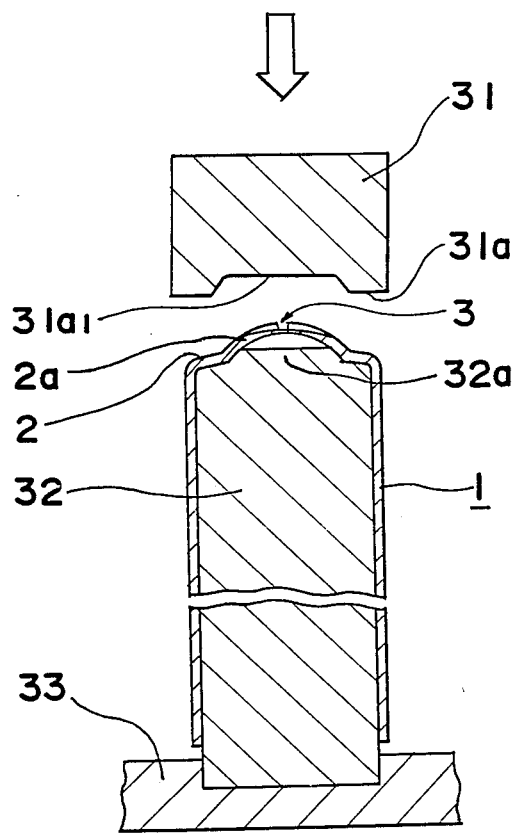
FIG. 26 is a sectional view showing the container of battery before a die for molding is fallen down onto the bottom portion for making the portion projected by forming a groove even.

Furthermore, according to the study of the present inventors, in case of forming the groove under the non-binding condition, the bottom portion of the container is projected due to forming the groove under the non-binding condition disclosed in example 8 as shown in FIG. 25, and the total height of the container of the battery is made 47.5 mm, which causes the error of the total height of the container of the battery and the error of supplying the container to the assembling process when assembling the battery Therefore, in the container of the battery according to the present invention, the bottom portion projected by forming the groove is made flat by press molding as shown in FIG. 26.

EXAMPLE 9

In FIG. 26, reference numeral 31 denotes a die for molding, numeral $31a$ denotes a lower surface of said die for molding 31, i.e., press surface, numeral $31a$, denotes a concave portion formed in the lower surface $31a$ of the die 31 and said concave portion $31a_1$ is formed in a shape adaptable to the outer shape of the convex portion $2a$ of the bottom portion 2 of the container 1 before forming the groove on the bottom portion 2. Reference numeral 32 denotes a female mold and numeral 33 denotes a pedestal. The female mold 32 is made cylindrical shaped and the upper surface thereof is formed in a shape adoptable to the inner shape of the bottom portion 2 of the container 1 before forming the groove on the bottom portion 2, having a projected portion $32a$ in the central portion thereof, and the container 1 disposed on the cylindrical female mold 32.

Then, the die for molding 31 is fallen down onto the bottom portion 2 of the container 1 disposed on the female mold 32 and is press-molded by a load of 20 kg/cm$^2$, whereby the bottom part $2a$ projected when forming the groove is made flat and the container 1 of the battery shown in FIG. 6 can be obtained. The height of the container 1 is made 47 mm, which is same a the height of the container before forming a groove.

The flattening operation of the bottom part 2a projected by forming the groove is only to recover the shape of the projected portion except the groove before forming the groove, the press molding may be performed under the pressure in the range of 10 to 50 kg/cm² as usual.

Figure 27:
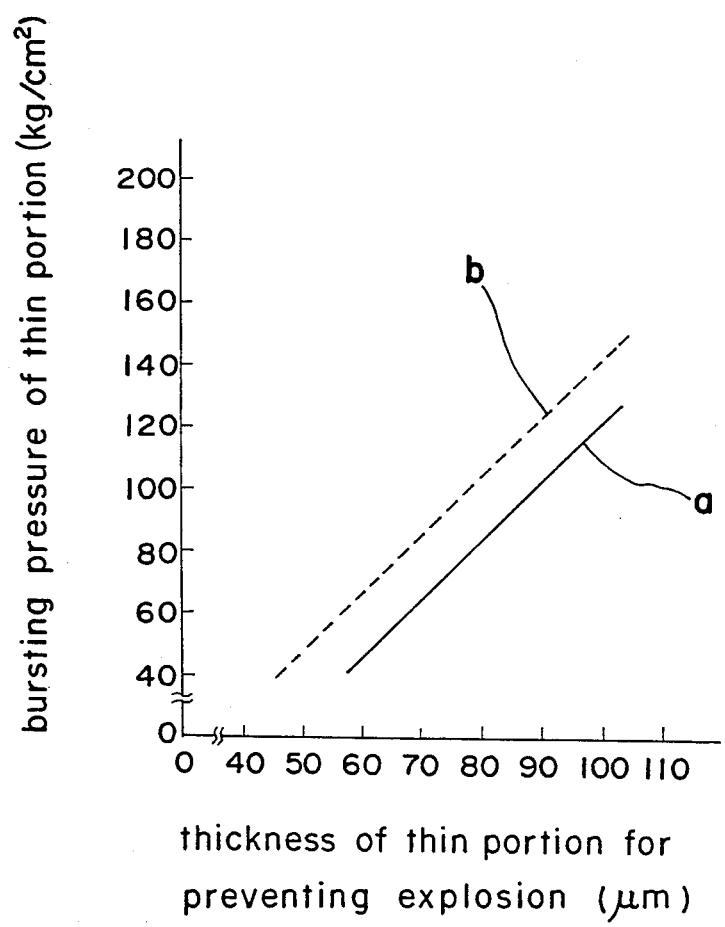
FIG. 27 is a graph showing a relationship between the thickness of the thin portion for preventing explosion and the internal pressure tearing and opening the thin portion.

FIG. 27 shows the relationship between the thickness of the thin portion fore preventing explosion and the pressure for tearing and opening the thin portion for preventing explosion, wherein a real line a represents the relationship in case of the container of the battery having the bottom part which is projected by forming the groove flattened after forming the groove on the bottom portion of the container, a dotted line b represents the relationship in case of the container of the battery having the bottom part projected by forming the groove on the bottom portion of the container, not flattened. As shown in FIG. 27, the pressure for tearing and opening the thin portion is lower in case the bottom part projected by forming the groove is flattened rather than that in case the bottom part projected by forming the groove is not flattened when comparing in a some thickness of the thin portion for preventing explosion. Hence, by flattening the bottom part projected by forming the groove, the function for preventing explosion can be worked in a lower pressure in case of the same thickness of the thin portion so that the function for preventing explosion can be worked more stably.

TABLE 1

| Sample No. | WIDTH OF FLAT SPOT (W) | THICKNESS OF THINNED PORTION (t) | W/t | OPERATING PRESSURE (kg/cm²) | NUMBER OF BATTERIES RUPTURED |
|---|---|---|---|---|---|
| 1 | 0.50 mm | 0.035 mm | 14.3 | 34 | 0/10 |
| 2 | 0.30 mm | 0.030 mm | 10.0 | 33 | 0/10 |
| 3 | 0.15 mm | 0.030 mm | 5.0 | 48 | 0/10 |
| 4 | 0.09 mm | 0.030 mm | 3.0 | 56 | 0/10 |
| 5 | 0.30 mm | 0.045 mm | 6.7 | 56 | 0/10 |
| 6 | 0.15 mm | 0.045 mm | 3.3 | 70 | 0/10 |
| 7 | 0.09 mm | 0.045 mm | 2.0 | 84 | 0/10 |
| 8 | 0.30 mm | 0.065 mm | 4.6 | 82 | 0/10 |
| 9 | 0.15 mm | 0.065 mm | 2.3 | 104 | 0/10 |
| 10 | 0.09 mm | 0.065 mm | 1.4 | 122 | 0/10 |
| 11 | 0.30 mm | 0.080 mm | 3.8 | 100 | 0/10 |
| 12 | 0.15 mm | 0.080 mm | 1.9 | 125 | 0/10 |
| 13 | 0.09 mm | 0.080 mm | 1.1 | 148 | 4/10 |
| 14 | $\theta = 90°$, 0.1 mmR | 0.045 mm | — | 108 | 3/10 |
| 15 | same as above | 0.065 mm | — | 142 | 8/10 |
| 16 | same as above | 0.080 mm | — | >155 | 10/10 |
| 17 | 90°, 0.2 mmR | 0.045 mm | — | 95 | 2/10 |
| 18 | same as above | 0.065 mm | — | 134 | 6/10 |
| 19 | same as above | 0.080 mm | — | >155 | 8/10 |

TABLE 2

| VOLUME OF AIR CHAMBER (μm) | THICKNESS OF THINNED PORTION (μm) | | | | |
|---|---|---|---|---|---|
| | 30 | 45 | 70 | 120 | 150 |
| 400 | Δ | Δ | Δ | Δ | X |
| 450 | Δ | O | O | O | X |
| 650 | Δ | O | O | O | X |
| 900 | Δ | O | O | O | X |
| 950 | O | O | O | O | X |

TABLE 3

| WIDTH W OF THINNED PORTION (mm) | RATE OF THINNED PORTION TO BOTTOM PORTION (%) | NUMBER OF RUPTURED BATTERIES | PRESSURE FOR TEARING THINNED PORTION (kg/cm²) |
|---|---|---|---|
| 0.05 | 0.5 | 2/10 | 60 |
| 0.07 | 0.7 | 0/10 | 66 |
| 0.10 | 1.0 | 0/10 | 70 |
| 0.15 | 1.6 | 0/10 | 65 |
| 0.30 | 3.1 | 0/10 | 80 |
| 0.50 | 5.2 | 0/10 | 135 |
| 0.60 | 6.2 | 6/10 | 280 |

TABLE 4

| RATIO (B/A) | OPERATED NUMBER | OPERATED TEMPERATURE | STRENGTH OF BOTTOM PORTION |
|---|---|---|---|
| 0 | 0/10 | 300 to 350 | 0/10 |
| 0.25 | 7/10 | 190 to 290 | 0/10 |
| 0.29 | 10/10 | 180 to 230 | 0/10 |
| 0.43 | 10/10 | 180 to 210 | 0/10 |
| 0.57 | 10/10 | 180 to 210 | 0/10 |
| 0.71 | 10/10 | 170 to 200 | 0/10 |
| 0.86 | 10/10 | 150 to 170 | 3/10 |
| 0.93 | 10/10 | 120 to 140 | 10/10 |

(Note) When the ratio (B/A) of the length B of the groove to the major diameter A of the container is 0, i.e., having no groove formed, the rupture temperature of the battery is shown in the column of the operating temperature of the function for preventing explosion.

TABLE 5

| SAMPLE No. | SECTIONAL VIEW OF GROOVE | THICKNESS OF THINNED PORTION | RATIO OF $t_1$ To $t_2$ | OPERATING PRESSURE (kg/cm₂) |
|---|---|---|---|---|
| 1 | handstand trapezoid | 80 | 1.05 | 118 |
| 2 | handstand trapezoid | 80 | 1.30 | 105 |

TABLE 5-continued

| SAMPLE No. | SECTIONAL VIEW OF GROOVE | THICKNESS OF THINNED PORTION | RATIO OF $t_1$ To $t_2$ | OPERATING PRESSURE (kg/cm$^2$) |
|---|---|---|---|---|
| 3 | handstand trapezoid | 80 | 1.50 | 96 |
| 4 | V character with round tip of 0.1 mmR | 80 | 1.00 | >155 |
| 5 | handstand trapezoid | 80 | 1.00 | 125 |

(Note)
$t_1$:thickness of intersection of grooves
$t_2$:thickness of other thinned portion

TABLE 6

| BATTERY | CONTAINER | NUMBER OF RUPTURED BATTERIES |
|---|---|---|
| EXAMPLE 1 | SAMPLE No. 1 | 0/10 |
| EXAMPLE 2 | SAMPLE No. 2 | 0/10 |
| EXAMPLE 3 | SAMPLE No. 3 | 0/10 |
| COMPARATIVE 1 | SAMPLE No. 4 | 10/10 |

TABLE 7

| CONTAINER | ANNEALING | HARDNESS | | OPERATING PRESSURE(kg/cm$^2$) | |
|---|---|---|---|---|---|
| | | AVERAGE | DISPERSION | AVERAGE | DISPERSION |
| SAMPLE No. 1 | YES | 170 | 150 to 240 | 90 | 80 to 100 |
| SAMPLE No. 2 | NO | 480 | 400 to 550 | 160 | 140 to 200 |

(Note)
The hardness is shown by Vickers hardness.

TABLE 8

| BATTERY | CONTAINER | NUMBER OF RUPTURED BATTERIES |
|---|---|---|
| PRESENT INVENTION | SAMPLE No. 1 | 0/100 |
| COMPARATIVE 1 | SAMPLE No. 2 | 93/100 |
| COMPARATIVE 2 | SAMPLE No. 3 | 75/100 |

TABLE 9

| | NUMBER OF RUPTURED BATTERIES |
|---|---|
| PRESENT INVENTION | 0/10 |
| COMPARATIVE ART | 6/10 |

What is claimed is:

1. A non-aqueous electrochemical battery comprising a positive active electrode material comprised of an oxyhalide liquid selected from thionyl chloride, sulfuryl chloride or phosphoryl chloride, a negative electrode comprised of an alkaline metal selected from lithium, sodium or potassium and a battery container which is sealed hermetically providing an air chamber on the top portion of the container, the improvement which comprises a plurality of grooves formed on the bottom of the battery container each of said grooves having a thinned and flat bottom and inclined side wall continued to both side edges of the thinned and flat bottom to form a reversed trapezoidal shape in a cross sectional view, each of side grooves being intersected with another of said grooves at least at one point, wherein the thickness of the thinned and flat bottom of the groove at the intersecting point is 1.05 to 1.5 times the thickness of the thinned and flat bottom of the rest of the groove, thereby providing an explosion-proof arrangement of the battery.

2. The battery according to claim 1, wherein the width of the thinned and flat bottom of the groove is 1.4 to 15 times the thickness of the thinned bottom.

3. The battery according to claim 1, wherein the thickness of said thinned and flat bottom of the groove is 45 to 120 μm and the volume of the air chamber is 7.5% to 15% of the total inner volume of the battery.

4. The battery according to claim 1, wherein the area of the thinned and flat bottom of the groove is 0.7 to 5.2% of the area of the bottom of the battery container.

5. The battery according to claim 1, wherein the length of each groove is 29 to 71% of the outer diameter of the battery container.

6. The battery according to claim 1, wherein the thinned and flat bottom of the groove is formed by press work and annealed and the hardness of the thinned and flat bottom after annealing is 150 to 240 vickers hardness.

7. The battery according to claim 1, wherein said battery further comprises a connection terminal comprising a ring shape portion or partly cut ring shape portion which is secured to the bottom of the battery container in such a manner that the ring shaped portion or partly cut ring shape portion does not cover said grooves.

* * * * *